(12) United States Patent
Hayaishi et al.

(10) Patent No.: US 8,781,258 B2
(45) Date of Patent: Jul. 15, 2014

(54) IMAGE PROCESSING APPARATUS AND IMAGE PROCESSING METHOD

(75) Inventors: Ikuo Hayaishi, Matsumoto (JP); Akio Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 910 days.

(21) Appl. No.: 12/055,106

(22) Filed: Mar. 25, 2008

(65) Prior Publication Data

US 2008/0240516 A1    Oct. 2, 2008

(30) Foreign Application Priority Data

Mar. 27, 2007    (JP) .................................. 2007-082325

(51) Int. Cl.
*G06K 9/32*    (2006.01)

(52) U.S. Cl.
USPC ........... 382/296; 345/581; 348/143; 382/103; 382/118; 382/173; 382/181; 382/199; 382/203; 382/229; 382/254; 382/256

(58) Field of Classification Search
None
See application file for complete search history.

(56) References Cited

U.S. PATENT DOCUMENTS

| | | | |
|---|---|---|---|
| 6,437,808 B1 * | 8/2002 | Brill et al. ...................... | 715/765 |
| 6,661,906 B1 * | 12/2003 | Kawade et al. ................ | 382/118 |
| 7,676,149 B2 * | 3/2010 | Wu et al. ........................ | 396/234 |
| 8,031,915 B2 * | 10/2011 | Hayaishi ........................ | 382/118 |
| 2001/0036298 A1 * | 11/2001 | Yamada et al. ................ | 382/118 |
| 2002/0070945 A1 * | 6/2002 | Kage ............................. | 345/581 |
| 2004/0085324 A1 * | 5/2004 | Yao ................................ | 345/581 |
| 2004/0105672 A1 * | 6/2004 | Misumi et al. ..................... | 396/2 |
| 2004/0161134 A1 * | 8/2004 | Kawato et al. ................ | 382/118 |
| 2004/0161163 A1 * | 8/2004 | Takamidoh .................... | 382/275 |
| 2004/0170337 A1 * | 9/2004 | Simon et al. .................. | 382/254 |
| 2005/0265604 A1 * | 12/2005 | Yuasa ............................ | 382/199 |
| 2006/0120571 A1 * | 6/2006 | Tu et al. ........................ | 382/118 |
| 2006/0126938 A1 * | 6/2006 | Lee et al. ...................... | 382/190 |
| 2006/0204034 A1 * | 9/2006 | Steinberg et al. ............. | 382/103 |
| 2007/0126868 A1 * | 6/2007 | Kiyohara et al. ............. | 348/143 |
| 2007/0266312 A1 * | 11/2007 | Ayaki et al. .................. | 715/526 |
| 2008/0212894 A1 * | 9/2008 | Demirli et al. ................ | 382/276 |
| 2008/0279469 A1 * | 11/2008 | Yamazaki ..................... | 382/254 |
| 2008/0284901 A1 * | 11/2008 | Misawa ........................ | 348/349 |
| 2008/0310720 A1 * | 12/2008 | Park et al. ..................... | 382/181 |
| 2009/0016617 A1 * | 1/2009 | Bregman-Amitai et al. . | 382/229 |
| 2009/0059029 A1 * | 3/2009 | Hoshii ........................ | 348/222.1 |
| 2009/0067718 A1 * | 3/2009 | Shingai ........................ | 382/173 |
| 2010/0046841 A1 * | 2/2010 | Yamazaki et al. ............ | 382/203 |
| 2010/0054620 A1 * | 3/2010 | Kobayashi .................... | 382/256 |

FOREIGN PATENT DOCUMENTS

| | | | |
|---|---|---|---|
| CA | 2217366 A1 * | 3/1999 | |
| CA | 2359269 A1 * | 4/2003 | |
| JP | 2004054759 A | 2/2004 | |
| JP | 2004-318204 | 11/2004 | |
| JP | 2006018467 A | 1/2006 | |

* cited by examiner

*Primary Examiner* — Tsung-Yin Tsai
(74) *Attorney, Agent, or Firm* — DLA Piper LLP (US)

(57) ABSTRACT

An image processing apparatus, includes: a transforming area setter, operable to set at least a part of an area of a target image as a transforming area; a transforming area divider, operable to arrange a plurality of dividing points in the transforming area and to divide the transforming area into a plurality of small areas by using a line connecting the dividing points; and a transforming processor, operable to move a position of at least one of the dividing points to transform at least one of the small areas, thereby transforming an image in the transforming area.

11 Claims, 19 Drawing Sheets

*FIG. 9*
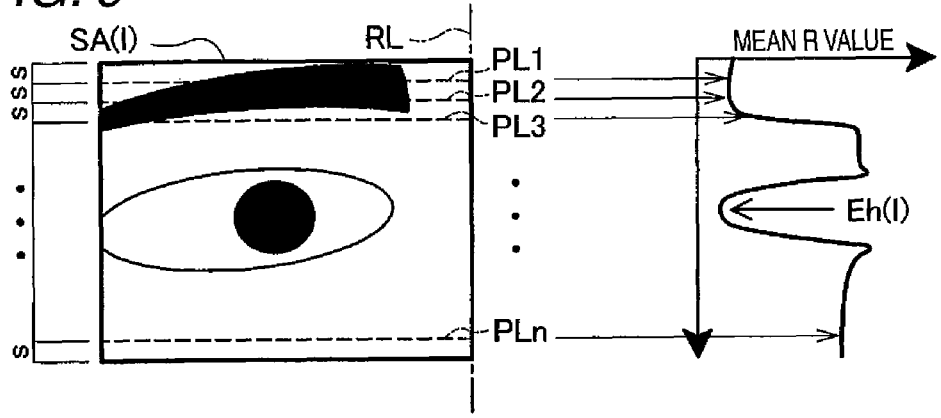
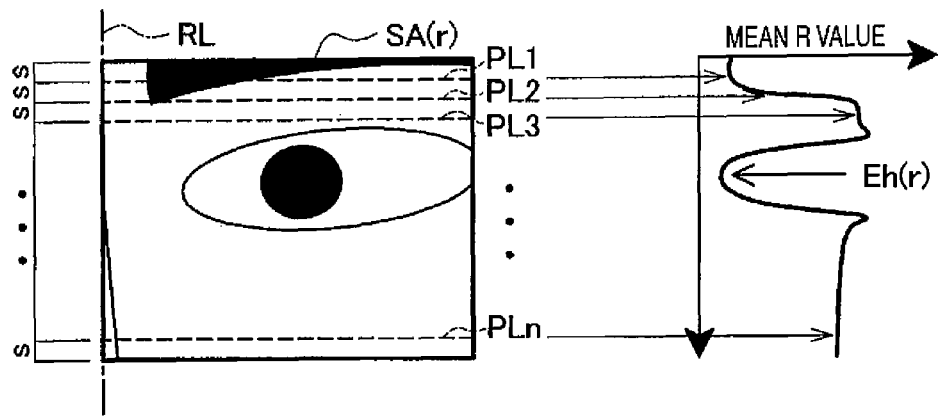
*FIG. 10A*  *FIG. 10B*
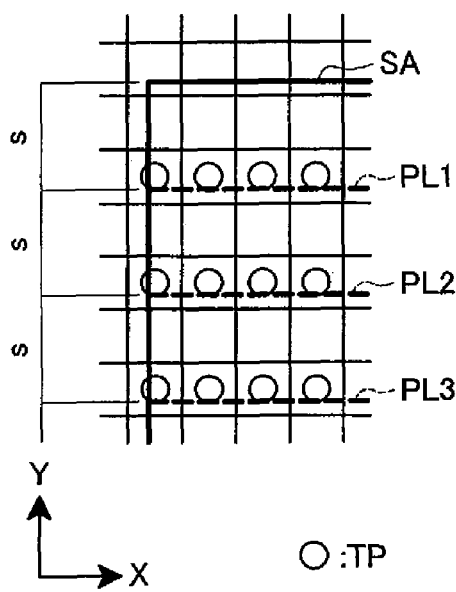 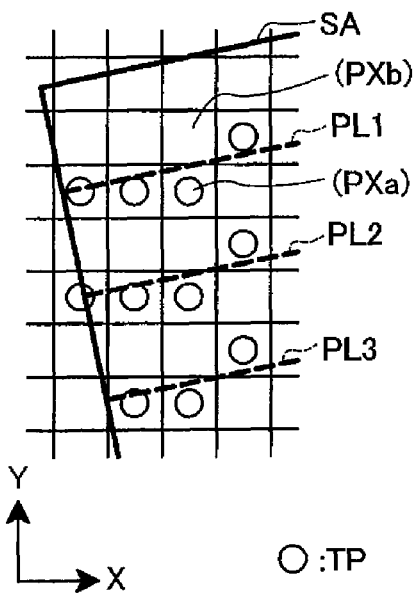

|     | H  | V  |
|-----|----|----|
| D11 | 7  | 14 |
| D21 | 7  | 14 |
| D31 | -7 | 14 |
| D41 | -7 | 14 |
| D12 | 7  | 0  |
| D22 | 0  | 0  |
| D32 | 0  | 0  |
| D42 | -7 | 0  |

| | H | V |
|---|---|---|
| D11 | 10 | 20 |
| D21 | 10 | 20 |
| D31 | -10 | 20 |
| D41 | -10 | 20 |
| D12 | 10 | 0 |
| D22 | 0 | 0 |
| D32 | 0 | 0 |
| D42 | -10 | 0 |

|  | H | V |
|---|---|---|
| D12 | 0 | 0 |
| D22 | 0 | -2 |
| D32 | 0 | -2 |
| D42 | 0 | 0 |
| D14 | 0 | 0 |
| D24 | 0 | 2 |
| D34 | 0 | 2 |
| D44 | 0 | 0 |

IMAGE PROCESSING APPARATUS AND IMAGE PROCESSING METHOD

BACKGROUND

1. Technical Field

The present invention relates to an image processing technique for transforming an image.

2. Related Art

There is a related-art image processing technique for transforming an image to be intended for a digital image (for example, J-P-A-2004-318204). JP-A-2004-318204 has disclosed an image processing of setting a part of areas on an image of a face (an area representing an image of a cheek) as a correcting area, dividing the correcting area into a plurality of small areas in accordance with a predetermined pattern and enlarging or reducing an image in a magnification set every small area, thereby transforming a shape of the face.

In the related-art image processing for transforming an image, an image is enlarged or reduced in a magnification set every small area. For this reason, the processing is complicated. Moreover, the related-art image processing for transforming an image is specialized for correcting a line of a cheek and copes with other various transforming manners with difficulty.

SUMMARY

An advantage of some aspects of the invention is to provide a technique capable of easily and efficiently implementing an image processing for transforming an image which corresponds to various transforming manners.

According to an aspect of the invention, there is provided an image processing apparatus, comprising:

a transforming area setter, operable to set at least a part of an area of a target image as a transforming area;

a transforming area divider, operable to arrange a plurality of dividing points in the transforming area and to divide the transforming area into a plurality of small areas by using a line connecting the dividing points; and a transforming processor, operable to move a position of at least one of the dividing points to transform at least one of the small areas, thereby transforming an image in the transforming area.

The present disclosure relates to the subject matter contained in Japanese patent application No. 2007-082325 filed on Mar. 27, 2007, which is expressly incorporated herein by reference in its entirety.

BRIEF DESCRIPTION OF THE DRAWINGS

The invention will be described with reference to the accompanying drawings, wherein like numbers reference like elements.

FIG. 9 is an explanatory view showing an example of a method of calculating an evaluation value.

FIGS. 10A and 10B are explanatory views showing an example of a method of selecting an evaluating target pixel.

DESCRIPTION OF EXEMPLARY EMBODIMENTS

Next, an embodiment according to the invention will be described in the following order based on examples.

A. First Example:
A-1. Structure of Image Processing Apparatus
A-2. Face Shape Correction Print Processing
A-3. Variant of First Example
B. Other Variants

A. First Example

A-1. Structure of Image Processing Apparatus

Figure 1:
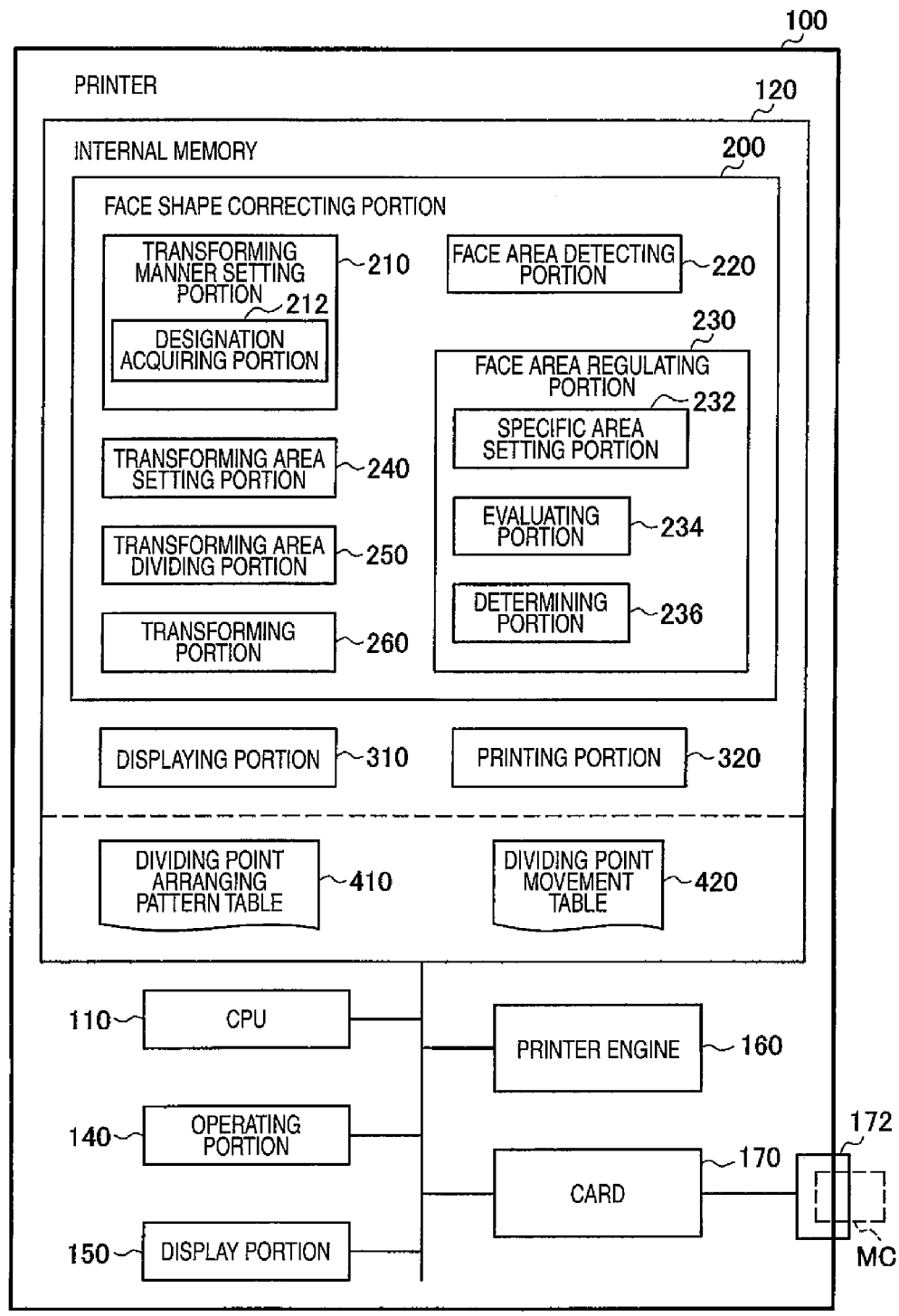
FIG. 1 is an explanatory diagram schematically showing a structure of a printer to be an image processing apparatus according to a first example of the invention.

FIG. 1 is an explanatory diagram schematically showing a structure of a printer 100 to be an image processing apparatus according to a first example of the invention. The printer 100 according to the example is a color ink jet printer corresponding to a so-called direct print which serves to print an image based on image data acquired from a memory card MC. The printer 100 comprises a CPU 110 for controlling each portion of the printer 100, an internal memory 120 constituted by an ROM or an RAM, for example, an operating portion 140 constituted by a button or a touch panel, a display portion 150 constituted by a liquid crystal display, a printer engine 160, and a car interface (a card I/F) 170. The printer 100 may further comprise an interface for carrying out a data communication with another apparatus (for example, a digital still camera). Respective components of the printer 100 are connected to each other through a bus.

The printer engine 160 is a printing mechanism for carrying out a print based on print data. The card interface 170 serves to transfer data together with a memory card MC inserted into a card slot 172. In the example, image data to be RGB data are stored in the memory card MC and the printer 100 acquires the image data stored in the memory card MC through the card interface 170.

A face shape correcting portion 200, a displaying portion 310 and a printing portion 320 are stored in the internal memory 120. The face shape correcting portion 200 is a computer program for executing a face shape correction processing which will be described below under a predetermined operating system. The displaying portion 310 is a display driver for controlling the display portion 150 to display a processing menu or a message on the display portion 150. The printing portion 320 is a computer program for generating print data from image data and controlling the printer engine 160 to execute a print of an image based on the print data. The CPU 110 reads and executes the programs from the internal memory 120, thereby implementing a function of each of the portions.

The face shape correcting portion 200 includes, as a program module, a transforming manner setting portion 210, a face area detecting portion 220, a face area regulating portion 230, a transforming area setting portion 240, a transforming area dividing portion 250 and a transforming portion 260. The transforming manner setting portion 210 includes a designation acquiring portion 212, and the face area regulating portion 230 includes a specific area setting portion 232, an evaluating portion 234 and a determining portion 236. A function of each of the portions will be explained in detail in the following description of a face shape correction print processing.

A dividing point arranging pattern table 410 and a dividing point movement table 420 are also stored in the internal memory 120. The contents of the dividing point arranging pattern table 410 and the dividing point movement table 420 will be explained in detail in the following description of the face shape correction print processing.

A-2. Face Shape Correction Print Processing

Figure 2:
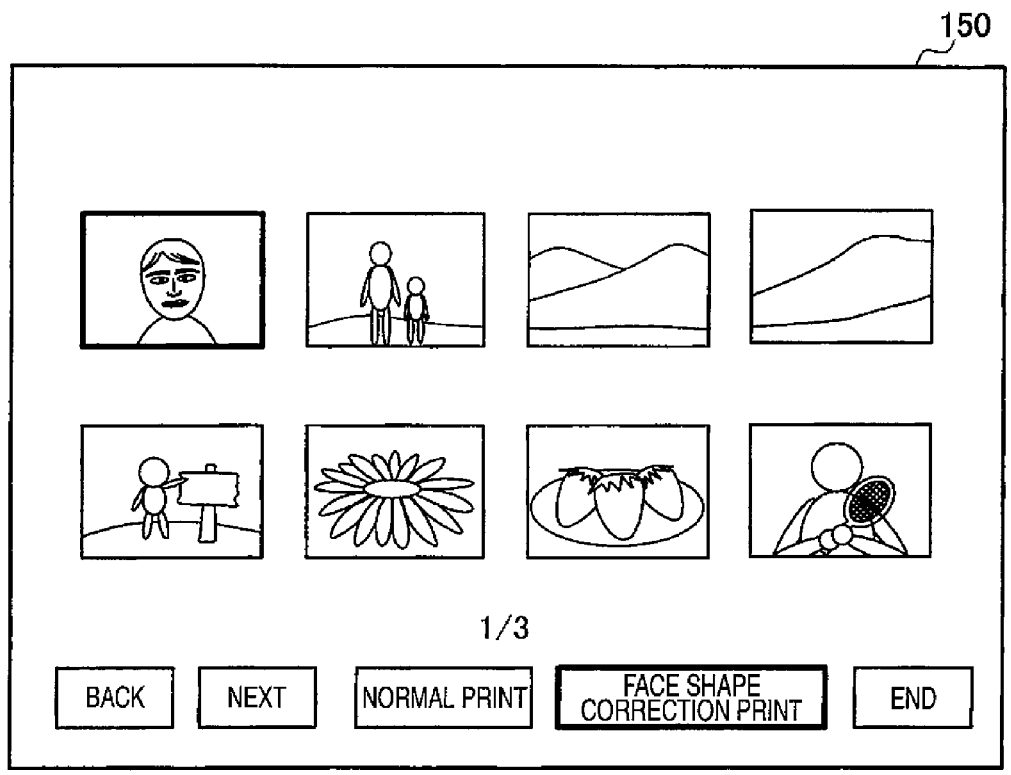
FIG. 2 is an explanatory view showing an example of a user interface including a list display of an image.

The printer 100 serves to print an image based on the image data stored in the memory card MC. When the memory card MC is inserted into the card slot 172, a user interface including a list display of an image stored in the memory card MC is displayed on the display portion 150 through the displaying portion 310. FIG. 2 is an explanatory view showing an example of the user interface including the list display of the image. In the example, the list display of the image is implemented by using a thumbnail image included in the image data (image file) stored in the memory card MC.

When an image (or a plurality of images) is selected and a normal print button is selected by a user in the user interface shown in FIG. 2, the printer 100 according to the example executes a normal print processing of normally printing the selected image. On the other hand, when an image (a plurality of images) is selected and a face shape correction print button is selected by the user in the user interface, the printer 100 executes a face shape correction print processing of correcting a shape of a face in an image and printing an image obtained after the correction for the selected image.

Figure 3:
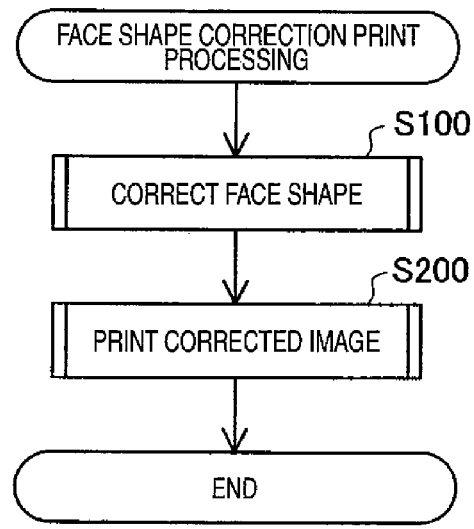
FIG. 3 is a flowchart showing a flow of a face shape correction print processing to be carried out by the printer according to the example.

FIG. 3 is a flowchart showing a flow of the face shape correction print processing to be carried out through the printer 100 according to the example. At Step S100, the face shape correcting portion 200 (FIG. 1) executes a face shape correction processing. The face shape correction processing according to the example serves to correct a shape of at least apart of the face (for example, a shape of a contour of the face or a shape of an eye) in the image.

Figure 4:
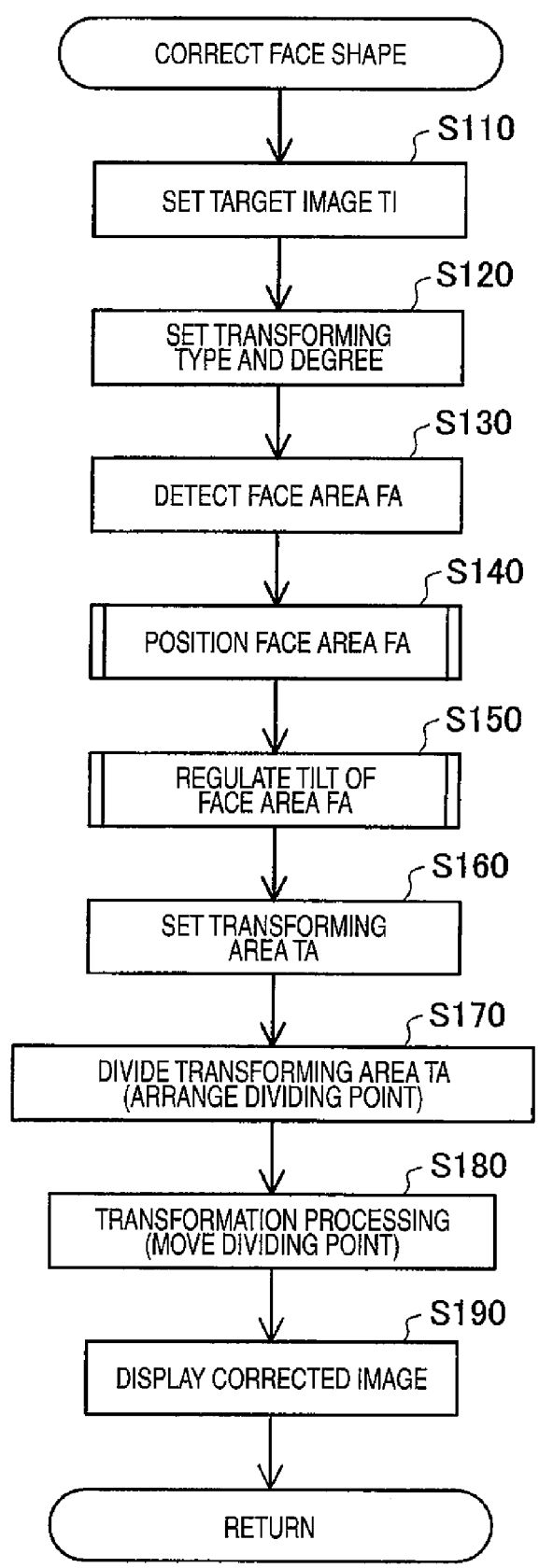
FIG. 4 is a flowchart showing a flow of a face shape correction processing according to the example.

FIG. 4 is a flowchart showing a flow of the face shape correction processing according to the example. At Step S110, the face shape correcting portion 200 (FIG. 1) sets a target image TI which is intended for the face shape correction processing. The face shape correcting portion 200 sets, as the target image TI, the image selected by the user in the user interface shown in FIG. 2. The image data of the target image TI thus set are acquired by the printer 100 from the memory card MC through the card interface 170 and are stored in a predetermined area of the internal memory 120.

At Step S120 (FIG. 4), the transforming manner setting portion 210 (FIG. 1) sets an image transforming type and an image transforming degree for correcting a face shape. The transforming manner setting portion 210 gives the displaying portion 310 an instruction for displaying, on the display portion 150, a user interface for setting the image transforming type and degree, and selects the image transforming type and degree designated by the user through the user interface and sets them as an image transforming type and degree to be used for the processing.

Figure 5:
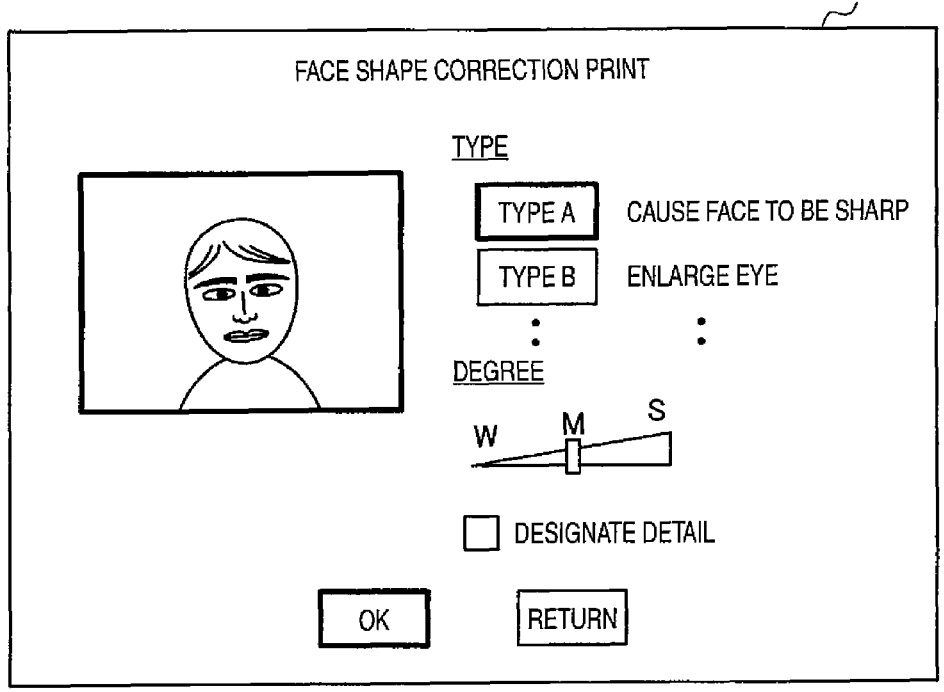
FIG. 5 is an explanatory view showing an example of a user interface for setting a type and a degree of an image transformation.

FIG. 5 is an explanatory view showing an example of the user interface for setting the image transforming type and degree. As shown in FIG. 5, the user interface includes an interface for setting the image transforming type. In the example, for instance, it is assumed that a transforming type "type A" for causing the shape of the face to be sharp and a transforming type "type B" for enlarging a shape of an eye are preset as choices. The user designates the image transforming type through the interface. The transforming manner setting portion 210 sets the image transforming type designated by the user as an image transforming type to be used for an actual processing.

Moreover, the user interface shown in FIG. 5 includes an interface for setting the image transforming degree (extent). As shown in FIG. 5, in the example, it is assumed that three stages of strong (S), middle (M) and weak (W) are preset as choices for the image transforming degree. The user designates the image transforming degree through the interface. The transforming manner setting portion 210 sets the image transforming degree designated by the user as the image transforming degree to be used in the actual processing.

In the example, it is possible to designate the details of the transforming manner through the user as will be described below. In the case in which a check box having a purport that a request for designating the details is given is checked by the user in the user interface shown in FIG. 5, the details of the transforming manner are designated by the user as will be described below.

Subsequently, description will be given on the assumption that the transforming type "type A" for causing the shape of the face to be sharp is set as the image transforming type and the degree of the extent "middle" is set as the image transforming degree, and the request for designating the details is not given by the user.

At Step S130 (FIG. 4), the face area detecting portion 220 (FIG. 1) detects the face area FA in the target image TI. The face area FA implies an image area provided on the target image TI which includes an image of at least a part of the face. The detection of the face area FA through the face area detecting portion 220 is executed by using a well-known face detecting method, for example, a pattern matching method utilizing a template (see JP-A-2004-318204).

Figure 6:
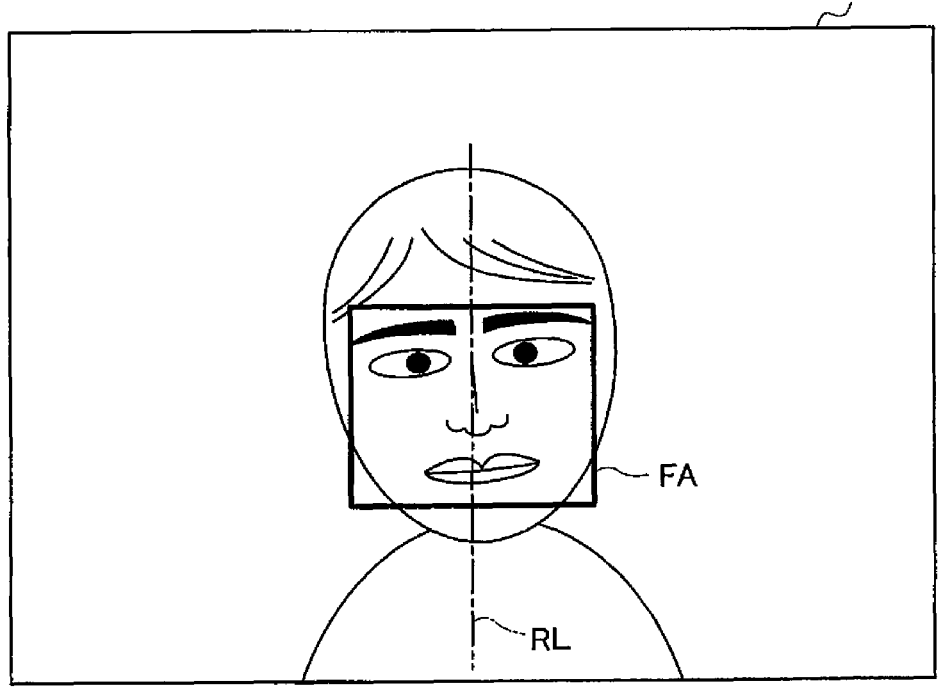
FIG. 6 is an explanatory view showing an example of a result of detection of a face area.

FIG. 6 is an explanatory view showing an example of a result of the detection of the face area FA. As shown in FIG. 6, according to a face detecting method used in the example, a rectangular area including images of an eye, a nose and a mouth on the target image TI is detected as the face area FA. A reference line RL shown in FIG. 6 defines a vertical direction (a perpendicular direction) of the face area FA and indicates a center in a transverse direction (a lateral direction) of the face area FA. More specifically, the reference line RL is a straight line which passes through a center of gravity of the rectangular face area FA and is parallel with a boundary line provided in the vertical direction (the perpendicular direction) of the face area FA.

In the detection of the face area FA at the Step S130, if the face area FA is not detected, a notice of the purport is given to the user through the display portion 150. In this case, a normal print having no face shape correction may be carried out or a processing of detecting the face area FA again using another face detecting method may be carried out.

In general, a well-known face detecting method such as a pattern matching method utilizing a template does not serve to detect a position and a tilt (an angle) for a whole face or a face portion (an eye or a mouse) in detail but to set, as the face area FA, an area supposed to include an image of the face from the target image TI on the whole. On the other hand, as will be described below, the printer 100 according to the example sets an area over which the image transformation processing for correcting the shape of the face is carried out based on the face area FA which is detected (a transforming area TA which will be described below). In general, the image of the face has a high degree of attention of an observer. Depending on a relationship of a position and an angle between the transforming area TA which is set and the image of the face, therefore, there is a possibility that an image obtained after correcting the shape of the face might be unnatural. In the example, therefore, it is assumed that positioning and a tilt regulation which will be described below are carried out for the face area FA detected at the Step S130 in such a manner that amore natural and preferable face shape correction can be implemented.

At Step S140 (FIG. 4), the face area regulating portion 230 (FIG. 1) carries out positioning in the vertical direction of the face area FA detected at the Step S130. The positioning in the vertical direction of the face area FA implies that a position placed along the reference line RL of the face area FA (see FIG. 6) is adjusted and the face area FA in the target image TI is reset.

Figure 7:
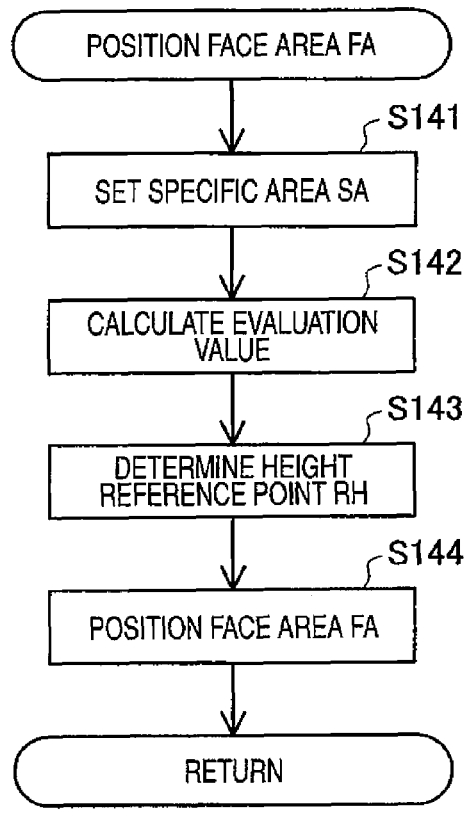
FIG. 7 is a flowchart showing a flow of a positioning processing in a vertical direction of the face area according to the example.

FIG. 7 is a flowchart showing a flow of the positioning processing in the vertical direction of the face area FA according to the example. At Step S141, the specific area setting portion 232 (FIG. 1) sets a specific area SA. The specific area SA is provided on the target image TI and includes an image of a predetermined reference object to be referred to when the positioning in the vertical direction of the face area FA is to be executed. In the example, the reference object is set to be an "eye" and the specific area SA is set to be an area including an image of the "eye".

Figure 8:
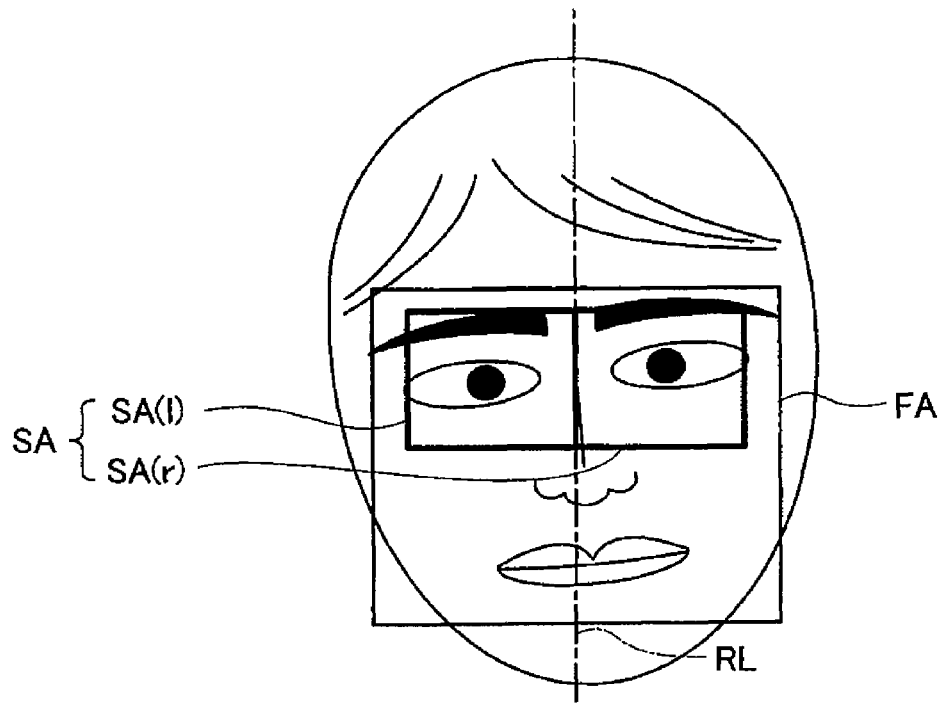
FIG. 8 is an explanatory view showing an example of a specific area.

FIG. 8 is an explanatory view showing an example of the specific area SA. In the example, the specific area setting portion 232 sets the specific area SA based on a relationship with the face area FA. More specifically, an area having a size obtained by reducing (or increasing) a size of the face area FA in a predetermined ratio in an orthogonal direction to the reference line RL and a parallel direction with the reference line RL and having a predetermined positional relationship with the position of the face area FA is set to be the specific area SA. More specifically, in the example, if the specific area SA is set based on the relationship with the face area FA detected by the face area detecting portion 220, the predetermined ratio and the predetermined positional relationship are preset in such a manner that the specific area SA includes images of both eyes. It is preferable that the specific area SA should be set to be a small possible area as long as the images of both eyes are included in such a manner that an image which is almost indistinguishable from the image of the eye (for example, an image of a hair) can be prevented from being included as greatly as possible.

As shown in FIG. 8, moreover, the specific area SA is set to be a rectangular area which is symmetrical with respect to the reference line RL. The specific area SA is divided into an area on a left side (hereinafter referred to as a "left divided specific area SA(l)") and an area on a right side (hereinafter referred to as a "right divided specific area as SA(r)") through the reference line RL. The specific area SA is set in such a manner that an image of one of the eyes is included in each of the left divided specific area SA(l) and the right divided specific area SA(r).

At Step S142 (FIG. 7), the evaluating portion 234 (FIG. 1) calculates an evaluation value for detecting a position of the image of the eye in the specific area SA. FIG. 9 is an explanatory view showing an example of a method of calculating the evaluation value. In the example, an R value (an R component value) of each pixel of the target image TI to be RGB image data is used for calculating the evaluation value. The reason is as follows. More specifically, it is supposed that the R value has a great difference between an image of a skin portion and an image of an eye portion and precision in detection of the image of the eye can be thus enhanced by using the R value for calculating the evaluation value. In the example, moreover, data on the target image TI are acquired as the RGB data. By using the R value for calculating the evaluation value, therefore, it is possible to enhance an efficiency of the calculation of the evaluation value. As shown in FIG. 9, the calculation of the evaluation value is individually carried out for each of the two divided specific areas (the right divided specific area SA(r) and the left divided specific area SA(l))".

As shown in FIG. 9, the evaluating portion 234 sets n straight lines (hereinafter referred to as "target pixel specifying lines PL1 to PLn") which are orthogonal to the reference line RL in the divided specific areas (the right divided specific area SA(r) and the left divided specific area SA(l)). The target pixel specifying lines PL1 to PLn are straight lines which divide a height of the divided specific area (a size along the reference line RL) into (n+1) equal parts. In other words, the target pixel specifying lines PL are provided at an equal interval s.

The evaluating portion 234 selects a pixel to be used in the calculation of the evaluation value (which will be hereinafter referred to as an "evaluating target pixel TP") from pixels constituting the target image TI for each of the target pixel specifying lines PL1 to PLn. FIGS. 10A and 10B are explanatory views showing an example of a method of selecting the evaluation target pixel TP. The evaluating portion 234 selects, as the evaluating target pixel TP, a pixel overlapping with the target pixel specifying line PL from the pixels constituting the target pixel TI. FIG. 10A shows the case in which the target pixel specifying line FL is parallel with a row direction of the pixels of the target pixel TI (an X direction in FIGS. 10A and 10B). In this case, pixels on a pixel row overlapping with each of the target pixel specifying lines PL (pixels having a mark of ○ in FIG. 10A) is selected as the evaluating target pixel TP for each of the target pixel specifying lines PL.

On the other hand, depending on the method of detecting the face area FA and the method of setting the specific area SA, the target pixel specifying line PL is not parallel with the row direction (X direction) of the pixel in the target pixel TI in some cases as shown in FIG. 10B. Also in these cases, the pixel overlapping with each of the target pixel specifying lines PL is selected as the evaluating target pixel TP for each of the target pixel specifying lines PL in principle. In the case in which one of the target pixel specifying lines PL overlaps with two pixels which are positioned in an identical column of a pixel matrix of the target image TI (that is, which have an identical Y coordinate) as in a relationship between the target pixel specifying line PL1 and pixels PXa and PXb in FIG. 10B, for example, a pixel having a shorter distance of an overlapping portion (for example, the pixel PXb) is excluded from the evaluating target pixel TP. More specifically, only one pixel is selected as the evaluating target pixel TP from one of columns of the pixel matrix for each of the target pixel specifying lines PL.

In the case in which a tilt of the target pixel specifying line PL exceeds 45 degrees with respect to the X direction, a relationship between the column and the row in the pixel matrix is reversed in the description so that only one of the pixels is selected as the evaluating target pixel TP from one of the rows in the pixel matrix. In some cases, moreover, one of the pixels is selected as the evaluating target pixel TP for a plurality of target pixel specifying lines PL depending on a relationship between the sizes of the target image TI and the specific area SA.

The evaluating portion 234 calculates, as the evaluation value, a mean value of the R value of the evaluating target pixel TP for each of the target pixel specifying lines PL. In the example, it is assumed that a part of the pixels having great R values in the evaluating target pixels TP which are selected are excluded from the calculating targets of the evaluation value for each of the target pixel specifying lines PL. More specifically, in the case in which k evaluating target pixels TP are selected for any of the target pixel specifying lines PL, for example, the evaluating target pixels TP are divided into two groups including a first group constituted by 0.75 k pixels having comparatively great R values and a second group constituted by 0.25 k pixels having comparatively small R values and only the pixels belonging to the second group are calculating targets of the mean value of the R value to be the evaluation value. The reason why a part of the evaluating target pixels TP is thus excluded from the calculating target of the evaluation value will be described below.

As described above, in the example, the evaluation value is calculated for each of the target pixel specifying lines PL through the evaluating portion 234. The target pixel specifying line PL is the straight line which is orthogonal to the reference line RL. Therefore, the evaluation value can be expressed to be calculated for a plurality of positions (evaluating positions) provided along the reference line RL. Moreover, the evaluation value can be represented as a value indicative of a feature of a distribution of pixel values in the orthogonal direction to the reference line RL for each of the evaluating positions.

At Step S143 (FIG. 7), the determining portion 236 (FIG. 1) detects the position of the eye in the specific area SA and determines a height reference point Rh based on a result of the detection. First of all, the determining portion 236 creates a curve representing a distribution of the evaluation value (the mean value of the R value) along the reference line RL and detects, as an eye position Eh, a position placed in the direction of the reference line RL in which the evaluation value takes a minimal value for each of the dividing specific areas as shown on a right side of FIG. 9. The eye position Eh in the left divided specific area SA(l) is represented as Eh(l) and the eye position Eh in the right divided specific area SA(r) is represented as Eh(r).

In case of Mongoloid, it can be supposed that a portion representing an image of a skin in the divided specific area has a great R value, while a portion representing an image of an eye (in more detail, a black portion provided on a center of the eye) has a small R value. As described above, therefore, it is possible to decide, as the eye position Eh, the position placed along the reference line RL in which the evaluation value (the mean value of the R value) takes a minimal value.

As shown in FIG. 9, the divided specific area includes another image having a small R value (for example, an image of an eyebrow or a hair) is addition to the image of the eye in some cases. For this reason, in the case in which the curve representing the distribution of the evaluation value along the reference line RL takes a plurality of minimal values, the determining portion 236 decides that any of the positions taking the minimal values which is placed on a lowermost side is the eye position Eh. In general, it can be supposed that an image having a small R value such as the eyebrow or the hair is often positioned on an upper side of the image of the eye and is rarely positioned on a lower side of the image of the eye. For this reason, it is possible to make the decision.

Even if the curve is placed on a lower side of the position of the image of the eye (a position which mainly corresponds to an image of a skin), moreover, there is a possibility that the curve might take a great evaluation value and a minimal value. For this reason, any of the minimal values which is greater than a predetermined threshold may be disregarded. Alternatively, a position of the target pixel specifying line PL corresponding to a minimum value in an evaluation value calculated for each of the target pixel specifying lines PL may be simply set to be the eye position Eh.

In the example, the eye (the black portion provided on the center of the eye) to be a portion which is supposed to have a comparatively great difference in a color from surroundings in the face is used as the reference object for positioning the face area FA. However, the mean value of the R value to be the evaluation value is calculated by setting, as a target, the evaluating target pixels TP on the target pixel specifying line PL. For example, therefore, there is a possibility that precision in the detection of the black portion might be reduced by the influence of an image of a white portion provided on a peripheral edge of the black portion. In the example, as described above, a part of the evaluating target pixels TP supposed to have the great difference in a color from the reference object (for example, the pixel belonging to the first group and having the comparatively great R value) is excluded from the calculating target of the evaluation value to enhance precision in the detection of the reference object.

Figure 11:
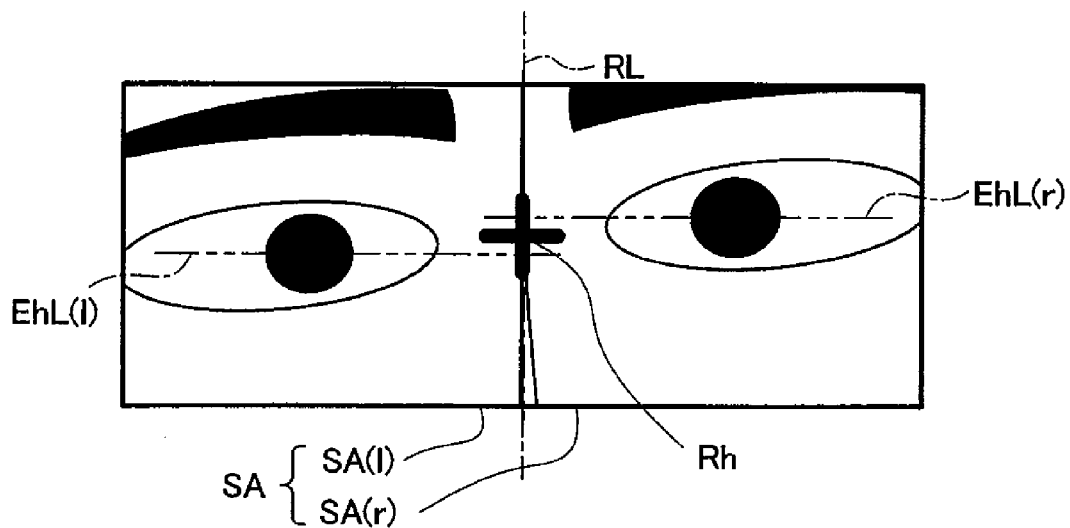
FIG. 11 is an explanatory view showing an example of a method of determining a height reference point.

Next, the determining portion 236 determines the height reference point Rh based on the eye position Eh which is detected. FIG. 11 is an explanatory view showing an example of a method of determining the height reference point Rh. The height reference point Rh is used as a reference in the positioning in the vertical direction of the face area FA. In the example, as shown in FIG. 11, a point on the reference line RL which is positioned in the middle of the two left and right eye positions Eh(l) and Eh(r) is set to be the height reference point Rh. More specifically, a middle point of an intersection of a straight line EhL(l) indicative of the left eye position Eh(l) and the reference line RL and an intersection of a straight line EhL(r) indicative of the right eye position Eh(r) and the reference line RL is set to be the high reference point Rh.

Figure 12:
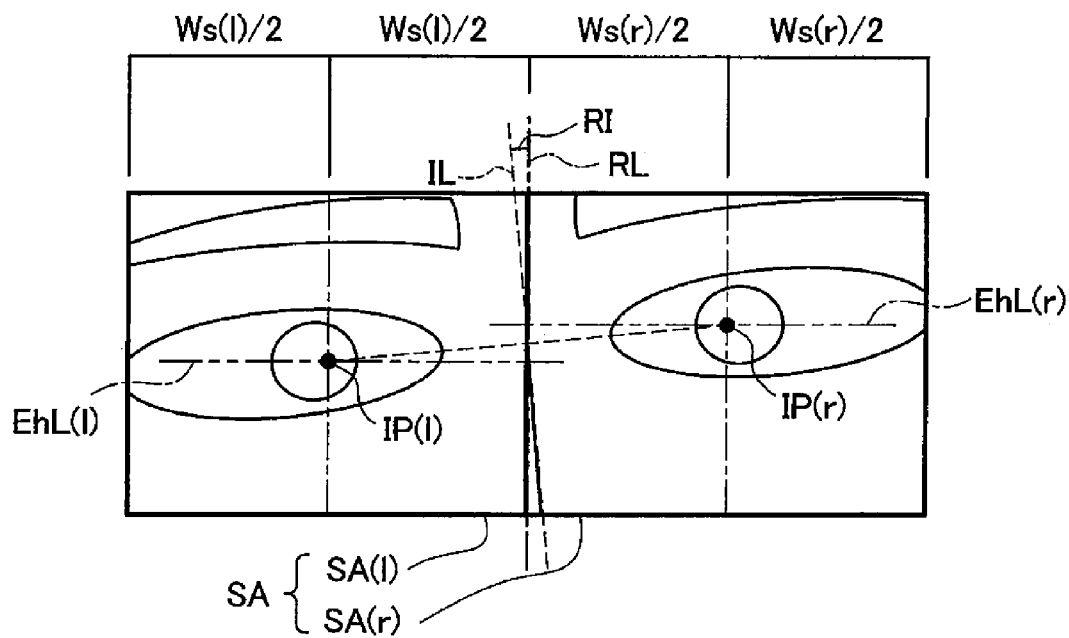
FIG. 12 is an explanatory view showing an example of a method of calculating an approximate tilt angle.

In the example, the determining portion 236 serves to calculate an approximate tilt angle of the face image (which will be hereinafter referred to as an "approximate tilt angle RI") based on the eye position Eh which is detected. The approximate tilt angle RI of the face image is obtained by estimating an approximate tilt of the image of the face in the target image TI with respect to the reference line RL of the face area FA. FIG. 12 is an explanatory view showing an example of a method of calculating the approximate tilt angle RI. As shown in FIG. 12, first of all, the determining portion 236 determines an intersection IP(l) of a straight line for dividing a width Ws(l) of the left divided specific area SA(l) into halves and the straight line EhL(l) and an intersection IP(r) of a straight line for dividing a width Ws(r) of the right divided specific area SA(r) into halves and the straight line EhL (r). Then, an angle formed by a straight line IL which is orthogonal to a straight line for connecting the intersection IP(l) and the intersection IP(r) and the reference line RL is calculated as the approximate tilt angle RI.

Figure 13:
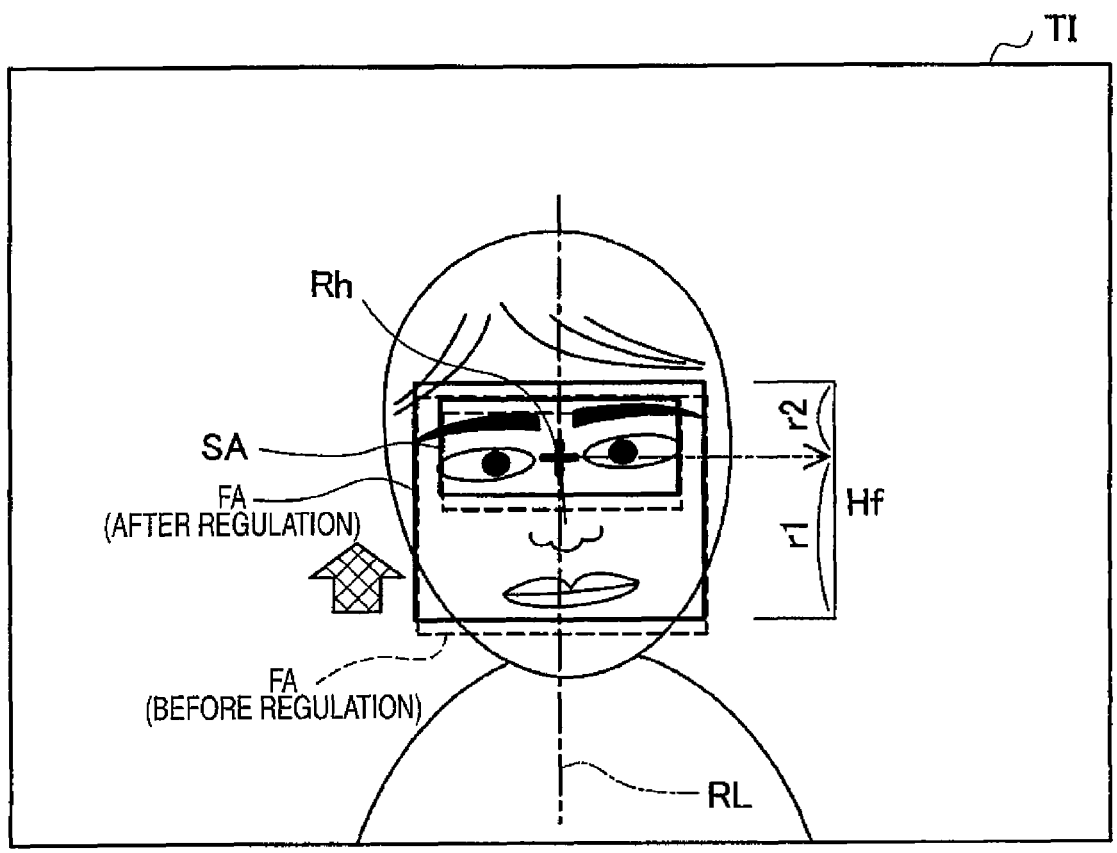
FIG. 13 is an explanatory view showing an example of a positioning method in the vertical direction of the face area.

At Step S144 (FIG. 7), the face area regulating portion 230 (FIG. 1) carries out the positioning in the vertical direction of the face area FA. FIG. 13 is an explanatory view showing an example of a method of carrying out the positioning in the vertical direction of the face area FA. The positioning in the vertical direction of the face area FA is carried out by resetting the face area FA in such a manner that the height reference point Rh is placed in a predetermined position in the face area FA obtained after the positioning. More specifically, as shown in FIG. 13, the face area FA is vertically positioned along the reference line RL in such a manner that the height reference point Rh is placed in a position to divide a height Hf of the face area FA at a predetermined ratio of r1 to r2. In the example of FIG. 13, the face area FA shown in a broken line which has not been subjected to the positioning is moved in an upper direction so that the face area FA shown in a solid line which is obtained after the positioning is reset.

After the positioning of the face area FA, at Step S150 (FIG. 4), the face area regulating portion 230 (FIG. 1) regulates the tilt (the angle) of the face area FA. The regulation of the tilt of the face area FA implies that the tilt of the face area FA in the target image TI is regulated to be adapted to the tilt of the image of the face and the face area FA is thus reset. In the example, a predetermined reference object to be referred to in the execution of the regulation of the tilt of the face area FA is set to be "both eyes". In the regulation of the tilt of the face area FA according to the example, a plurality of evaluating directions representing choices of a tilt regulating angle is set and an evaluating specific area ESA corresponding to each of the evaluating directions is set as an area including images of both eyes. The evaluation value is calculated based on a pixel value of an image of the evaluating specific area ESA for each of the evaluating directions and the tilt of the face area FA is regulated by using the tilt regulating angle determined based on the evaluation value.

Figure 14:
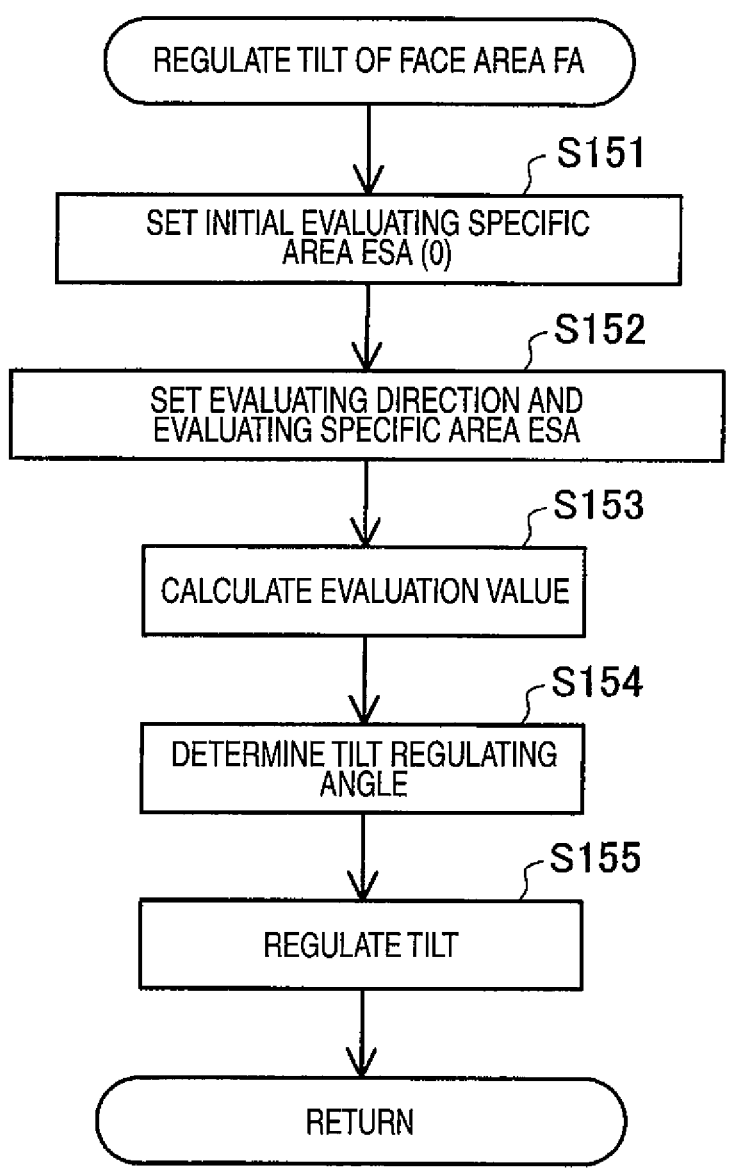
FIG. 14 is a flowchart showing a flow of a processing of regulating a tilt of the face area according to the example.
Figure 15:
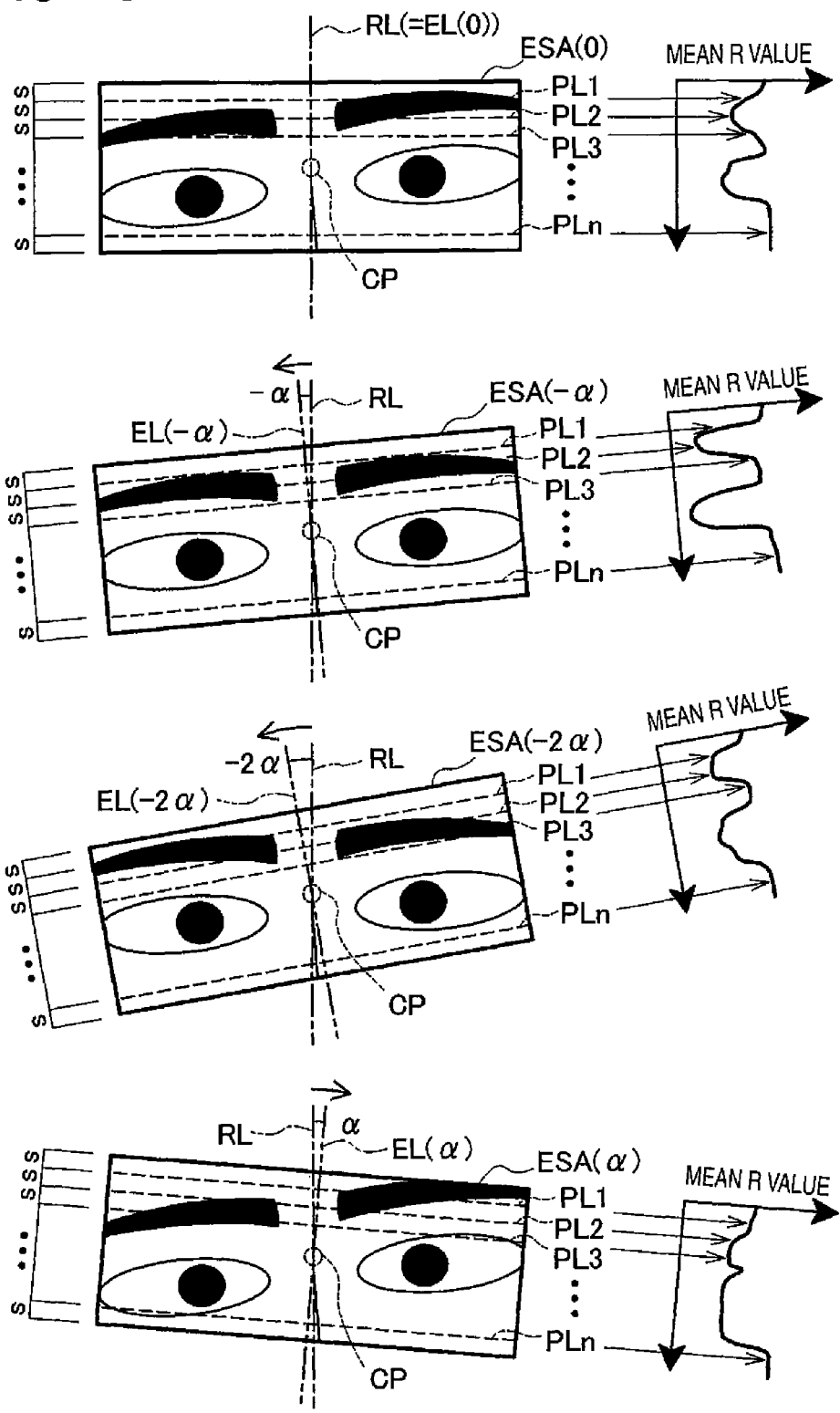
FIG. 15 is an explanatory view showing an example of a method of calculating an evaluation value to regulate the tilt of the face area.

FIG. 14 is a flowchart showing a flow of a processing of regulating the tilt of the face area FA according to the example. Moreover, FIG. 15 is an explanatory view showing an example of a method of calculating an evaluation value for regulating the tilt of the face area FA. At Step S151 (FIG. 14), the specific area setting portion 232 (FIG. 1) sets an initial evaluating specific area ESA(0). The initial evaluating specific area ESA(0) is the estimating specific area ESA corresponding to a parallel direction (hereinafter referred to as an "initial evaluating direction") with the reference line RL obtained after the positioning of the face area FA (see FIG. 13). In the example, the specific area SA corresponding to the face area FA obtained after the positioning (see FIG. 13) is exactly set as the initial evaluating specific area ESA(0). The evaluating specific area ESA obtained after regulating the tilt of the face area FA is not divided into two left and right areas differently from the specific area SA in the positioning of the face area FA. The set initial evaluating specific area ESA(0) is shown in an uppermost stage of FIG. 15.

At Step S152 (FIG. 14), the specific area setting portion 232 (FIG. 1) sets a plurality of evaluating directions and the evaluating specific area ESA corresponding to each of the evaluating directions. The evaluating directions are set as a direction representing choices of the tilt regulating angle. In the example, a plurality of evaluating direction lines EL having an angle formed with respect to the reference line RL within a predetermined range is set and a parallel direction with the evaluating direction line EL is set to be the evaluating direction. As shown in FIG. 15, a straight line determined by rotating the reference line RL every predetermined angle α counterclockwise and clockwise around a central point (a center of gravity) CP of the initial evaluating specific area ESA(0) is set to be the evaluating direction lines EL. The evaluating direction line EL having an angle of ϕ degrees formed with respect to the reference line RL is represented as EL(ϕ).

In the example, a predetermined range for the angle formed by each of the evaluating direction lines EL and the reference line RL is set to be ±20 degrees. In the specification, a rotating angle at which the reference line RL is rotated clockwise is expressed in a positive value and a rotating angle at which the reference line RL is rotated counterclockwise is expressed in a negative value. The specific area setting portion 232 rotates the reference line RL counterclockwise and clockwise while increasing the rotating angle within such a range as not to exceed 20 degrees, for example, α degrees, 2α degrees . . . , and sets the evaluating direction lines EL. FIG. 15 shows the evaluating direction line EL (EL(-α), EL(-2α), EL(α)) determined through the rotation of the reference line RL by -α degrees, -2α degrees and a degrees, respectively. The reference line RL can also be represented as an evaluating direction line EL(0).

The evaluating specific area ESA corresponding to the evaluating direction line EL representing each of the evaluating directions is obtained by rotating the initial evaluating specific area ESA(0) around the central point CP at an equal angle to a rotating angle in the operation for setting the evaluating direction line EL. The evaluating specific area ESA corresponding to the evaluating direction line EL(ϕ) is represented as an evaluating specific area ESA(ϕ). FIG. 15 shows evaluating specific areas ESA (ESA(-α), ESA(-2α), ESA (α)) corresponding to the evaluating direction lines EL(-α), EL(-2α) and EL(α), respectively. It is assumed that the initial evaluating specific area ESA(0) is also treated as one of the evaluating specific areas ESA.

At Step S153 (FIG. 14), the evaluating portion 234 (FIG. 1) calculates the evaluation value based on the pixel value of the image of the evaluating specific area ESA in each of the evaluating directions which are set. In the example, the mean value of the R value is used as an evaluation value in the regulation of the tilt of the face area FA in the same manner as the evaluation value in the positioning of the face area FA. The evaluating portion 234 calculates the evaluation values for a plurality of evaluating positions in the evaluating direction.

A method of calculating the evaluation value is the same as the method of calculating the evaluation value in the positioning of the face area FA. More specifically, as shown in FIG. 15, the evaluating portion 234 sets the target pixel specifying lines PL1 to PLn which are orthogonal to the evaluating direction line EL in the respective evaluating specific areas ESA and selects the evaluating target pixel TP for each of the target pixel specifying lines PL1 to PLn, and calculates, as the evaluation value, the mean value of the R value of the evaluating target pixel TP thus selected.

A method of setting the target pixel specifying line PL and a method of selecting the evaluating target pixel TP in the evaluating specific area ESA have a difference as to whether they transversely divide the area but are the same as the method of positioning the face area FA shown in FIGS. 9 and 10. In the same manner as in the positioning of the face area FA, a part of the evaluating target pixels TP which are selected (for example, 0.75 k pixels having comparatively great R values in k evaluating target pixels TP) may be excluded from the calculating target of the evaluation value. A distribution along the evaluating direction line EL of the calculated evaluation value for each of the evaluating directions is shown on a right side of FIG. 15.

The target pixel specifying line PL is the straight line which is orthogonal to the evaluating direction line EL. Therefore, the evaluation value can be expressed to be calculated for a plurality of positions (evaluating positions) placed along the evaluating direction line EL. Moreover, the evaluation value can be expressed as a value representing a feature of a distribution of a pixel value in an orthogonal direction to the evaluating direction line EL for each of the evaluating positions.

At Step S154 (FIG. 14), the determining portion 236 (FIG. 1) determines a regulating angle to be used for regulating the tilt of the face area FA. The determining portion 236 calculates a variance along the evaluating direction line EL of the evaluation value calculated at the Step S153 for each of the evaluating directions and selects any of the evaluating directions in which a value of the variance is maximized. An angle formed by the evaluating direction line EL corresponding to the evaluating direction thus selected and the reference line RL is determined as the regulating angle to be used for regulating the tilt.

Figure 16:
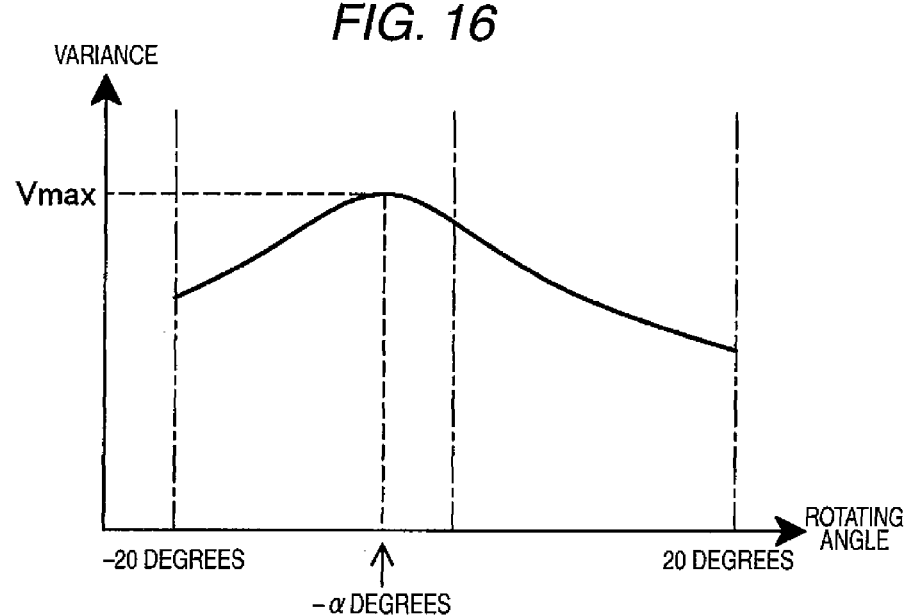
FIG. 16 is an explanatory chart showing an example of a result of calculation of a variance of the evaluation value with respect to each evaluating direction.

FIG. 16 is an explanatory chart showing an example of a result obtained by calculating the variance of the evaluation value for each of the evaluating directions. In the example of FIG. 16, the variance takes a maximum value Vmax in the evaluating direction in which the rotating angle is $-\alpha$ degrees. Accordingly, the rotating angle of $-\alpha$ degrees, that is, a degrees in a counterclockwise direction is determined as the regulating angle to be used for regulating the tilt of the face area FA.

Description will be given to the reason why the angle corresponding to the evaluating direction in which the value of the variance of the evaluation value is the maximum is determined as the regulating angle to be used for regulating the tilt. As shown in a second stage from a top in FIG. 15, images of central parts (black portions) of left and right eyes are arranged in an almost parallel direction with the target image specifying line PL (that is, an orthogonal direction to the evaluating direction line EL) in the evaluating specific area ESA($-\alpha$) at the rotating angle of $-\alpha$ degrees. At this time, images of left and right eyebrows are also arranged in almost the orthogonal direction to the evaluating direction line EL. Accordingly, it can be supposed that the evaluating direction corresponding to the evaluating direction line EL almost represents the tilt of the image of the face. In this case, as a positional relationship between the image of the eye or eyebrow having a generally small R value and an image of a skin portion having a generally great R value, their overlapping portion is small in the direction of the target pixel specifying line PL. For this reason, the evaluation value in the position of the image of the eye or the eyebrow is comparatively small and the evaluation value in the position of the image of the skin portion is comparatively great. Accordingly, the distribution of the evaluation value along the evaluating direction line EL has a comparatively large variation (a high amplitude) as shown in FIG. 15, and the value of the variance is thus increased.

On the other hand, as shown in uppermost, third and fourth stages in FIG. 15, in the evaluating specific areas ESA(0), ESA($-2\alpha$) and ESA($\alpha$) in the case in which the rotating angle is zero degree, $-2\alpha$ degrees and $\alpha$ degrees, the images of the central parts of the left and right eyes and the left and right eyebrows are not arranged in the orthogonal direction to the evaluating direction line EL but are shifted. Accordingly, an evaluating direction corresponding to the evaluating direction line EL does not represent the tilt of the image of the face. At this time, as the positional relationship between the image of the eye or the eyebrow and that of the skin portion, their overlapping portion is large in the direction of the target pixel specifying line PL. For this reason, the distribution of the evaluation value along the evaluating direction line EL has a comparatively small variation (a low amplitude) as shown in FIG. 15, and the value of the variance is thus reduced.

As described above, the value of the variance of the evaluation value along the evaluating direction line EL is increased when the evaluating direction is close to the direction of the tilt of the image of the face, and is reduced when the evaluating direction is distant from the direction of the tilt of the image of the face. By determining, as a regulating angle to be used for the tilt regulation, an angle corresponding to the evaluating direction in the case in which the value of the variance of the evaluation value is a maximum, accordingly, it is possible to implement the regulation of the tilt of the face area FA in such a manner that the tilt of the face area FA is adapted to the tilt of the image of the face.

In the example, in the case in which a maximum value is taken with a critical value in a range of an angle, that is, at $-20$ or 20 degrees as a result obtained by calculating the variance of the evaluation value, it can be supposed that there is a high possibility that the tilt of the face might not be evaluated accurately. For this reason, it is assumed that the tilt of the face area FA is not regulated.

In the example, moreover, the determined regulating angle is compared with the approximate tilt angle RI calculated in the positioning of the face area FA. In the case in which a difference between the regulating angle and the approximate tilt angle RI is greater than a predetermined threshold, it can be supposed that some error is made in the evaluation or determination in the positioning and tilt regulation of the face area FA. For this reason, it is assumed that the positioning and tilt regulation of the face area FA is not carried out.

Figure 17:
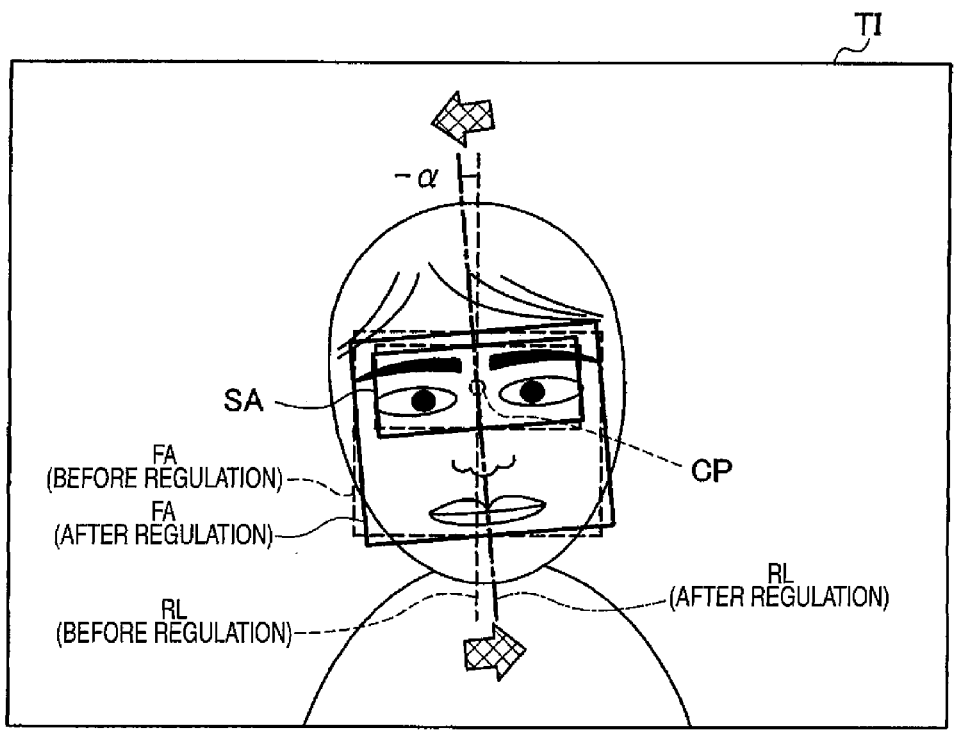
FIG. 17 is an explanatory view showing an example of a method of regulating the tilt of the face area.

At Step S155 (FIG. 14), the face area regulating portion 230 (FIG. 1) regulates the tilt of the face area FA. FIG. 17 is an explanatory view showing an example of a method of regulating the tilt of the face area FA. The tilt of the face area FA is regulated by rotating the face area FA around the central point CP of the initial evaluating specific area ESA(0) by the regulating angle determined at the Step S154. In the example of FIG. 17, the face area FA which has not been regulated as shown in a broken line is rotated counterclockwise by a degrees so that the face area FA which has been regulated as shown in a solid line is set.

Figure 18:
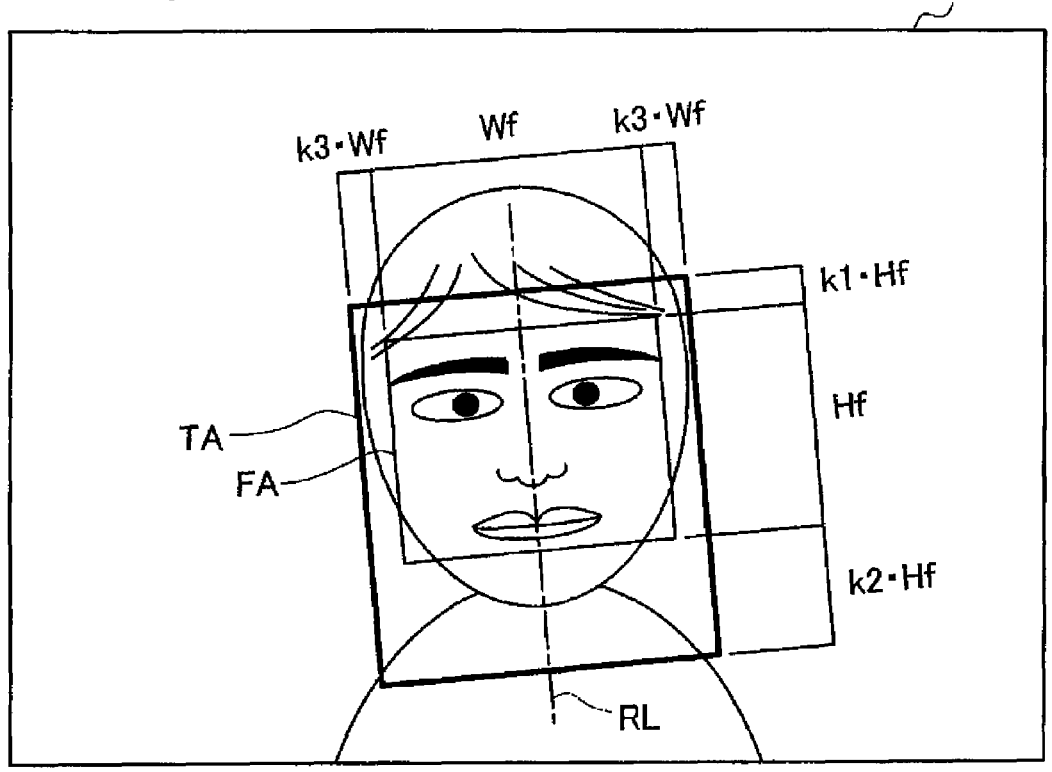
FIG. 18 is an explanatory view showing an example of a method of setting a transforming area.

At Step S160 (FIG. 4) to be carried out after the regulation of the tilt of the face area FA is ended, the transforming area setting portion 240 (FIG. 1) sets the transforming area TA. The transforming area TA is provided on the target image TI and is intended for an image transformation processing for correcting the face shape. FIG. 18 is an explanatory view showing an example of a method of setting the transforming area TA. As shown in FIG. 18, in the example, the transforming area TA is set as an area obtained by extending (or shortening) the face area FA in a parallel direction with the reference line RL (a vertical direction) and an orthogonal direction to the reference line RL (a transverse direction) More specifically, if a size in the vertical direction of the face area FA is represented as Hf and a size in the transverse direction is represented as Wf, the face area FA is extended by k1·Hf in an upper direction and k2 Hf in a lower direction and an area extended by k3·Wf in leftward and rightward directions respectively is set to be the transforming area TA. k1, k2 and k3 denote predetermined coefficients.

When the transforming area TA is set, thus, the reference line RL to be a parallel straight line with a contour line in the vertical direction of the face area FA is also a straight line which is parallel with a contour line in the vertical direction of the transforming area TA. Moreover, the reference line RL is a straight line for dividing a width of the transforming area TA into halves.

As shown in FIG. 18, the transforming area TA is set to be an area which almost includes images from a chin to a forehead in the vertical direction and includes images of left and right cheeks in the transverse direction. More specifically, in the example, the coefficients k1, k2 and k3 are preset based on a relationship with the size of the face area FA in such a manner that the transforming area TA almost includes the images within the range.

Figure 19:
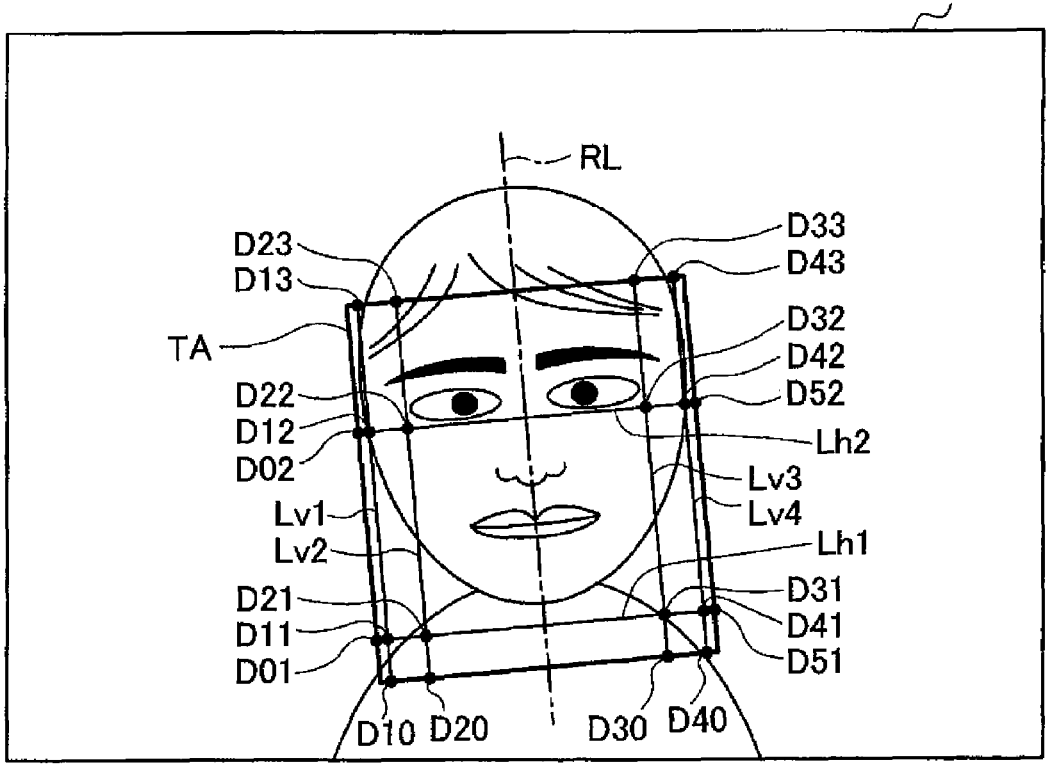
FIG. 19 is an explanatory view showing an example of a method of dividing the transforming area into small areas.

At Step S170 (FIG. 4), the transforming area dividing portion 250 (FIG. 1) divides the transforming area TA into a plurality of small areas. FIG. 19 is an explanatory view showing an example of a method of dividing the transforming area TA into small areas. The transforming area dividing portion 250 arranges a plurality of dividing points D in the transforming area TA and divides the transforming area TA into a plurality of small areas by using a straight line for connecting the dividing points D.

A manner for arranging the dividing points D (the number and positions of the dividing points D) is defined corresponding to the transforming type set at the Step S120 (FIG. 4) through the dividing point arranging pattern table 410 (FIG. 1). The transforming area dividing portion 250 refers to the dividing point arranging pattern table 410 to arrange the dividing point D in a corresponding manner to the transforming type set at the Step S120. In the example, as described above, the transforming "type A" for causing the face to be sharp (see FIG. 5) is set as the transforming type. Therefore, the dividing point D is arranged in a corresponding manner to the transforming type.

As shown in FIG. 19, the dividing point D is arranged on an intersection of a horizontal dividing line Lh and a vertical dividing line Lv and an intersection of the horizontal dividing line Lh and vertical dividing line Lv and an outer frame of the transforming area TA. The horizontal dividing line Lh and the vertical dividing line Lv serve as a reference for arranging the dividing point D in the transforming area TA. As shown in FIG. 19, two horizontal dividing lines Lh which are orthogonal to the reference line RL and four vertical dividing lines Lv which are parallel with the reference line RL are set in the arrangement of the dividing point D corresponding to the transforming type for causing the face to be sharp. The two horizontal dividing lines Lh are referred to as Lh1 and Lh2 in order from a bottom of the transforming area TA. Moreover, the four vertical dividing lines Lv are referred to as Lv1, Lv2, Lv3 and Lv4 in order from a left of the transforming area TA.

The horizontal dividing line Lh1 is disposed below the image of the chin in the transforming area TA and the horizontal dividing line Lh2 is disposed in the vicinity of a just lower part of the image of the eye. Moreover, the vertical dividing lines Lv1 and Lv4 are disposed on an outside of the image of the line of the cheek, and the vertical dividing lines Lv2 and Lv3 are disposed on an outside of an image of a corner of the eye. The horizontal dividing line Lh and the vertical dividing line Lv are disposed in accordance with a corresponding relationship with the preset size of the transforming area TA in such a manner that the positional relationship between the images of the horizontal dividing line Lh and the vertical dividing line Lv is consequently obtained as described above.

In accordance with the arrangement of the horizontal dividing line Lh and the vertical dividing line Lv, the dividing point D is disposed on the intersection of the horizontal dividing line Lh and the vertical dividing line Lv and the intersection of the horizontal dividing line Lh and vertical dividing line Lv and the outer frame of the transforming area TA. As shown in FIG. 19, the dividing point D positioned on a horizontal dividing line Lhi (i=1 or 2) is referred to as D0$i$, D1$i$, D2$i$, D3$i$, D4$i$ and D5$i$ in order from a left. For example, the dividing point D positioned on the horizontal dividing line Lh1 is referred to as D01, D11, D21, D31, D41 and D51. Similarly, the dividing point D positioned on a vertical dividing line Lvj (j=1, 2, 3 or 4) is referred to as Dj0, Dj1, Dj2 and Dj3 in order from the bottom. For example, the dividing point D positioned on the vertical dividing line Lv1 is referred to as D10, D11, D12 and D13.

As shown in FIG. 19, the arrangement of the dividing point D according to the example is symmetrical with respect to the reference line RL.

The transforming area dividing portion 250 divides the transforming area TA into a plurality of small areas through straight lines connecting the arranged dividing points D (that is, the horizontal dividing line Lh and the vertical dividing line Lv). In the example, the transforming area TA is divided into 15 small rectangular areas as shown in FIG. 19.

In the example, the arrangement of the dividing point D is determined by the number and positions of the horizontal dividing lines Lh and the vertical dividing lines Lv. Therefore, it is also apparent that the dividing point arranging pattern table 410 defines the number and positions of the horizontal dividing lines Lh and the vertical dividing lines Lv.

At Step S180 (FIG. 4), the transforming portion 260 (FIG. 1) carries out a processing of transforming an image which is intended for the transforming area TA of the target image TI. The transformation processing is carried out through the transforming portion 260 by moving the position of the dividing point D arranged in the transforming area TA at the Step S170 to transform the small area.

A manner for moving the position of each of the dividing points D to carry out the transformation processing (a moving direction and a moving distance) is preset through the dividing point movement table 420 (FIG. 1) corresponding to a combination of the transforming type and the transforming degree which are set at the Step S120 (FIG. 4). The transforming portion 260 refers to the dividing point movement table 420, thereby moving the position of the dividing point D in the moving direction by the moving distance corresponding to the combination of the transforming type and the transforming degree which are set at the Step S120.

In the example, as described above, the transforming "type A" for causing the face to be sharp (see FIG. 5) is set as the transforming type, and a degree of an extent "middle" is set as the transforming degree. Therefore, the position of the dividing point D is moved in the moving direction by the moving distance corresponding to the combination of the transforming type and the transforming degree.

Figures 20, 21:
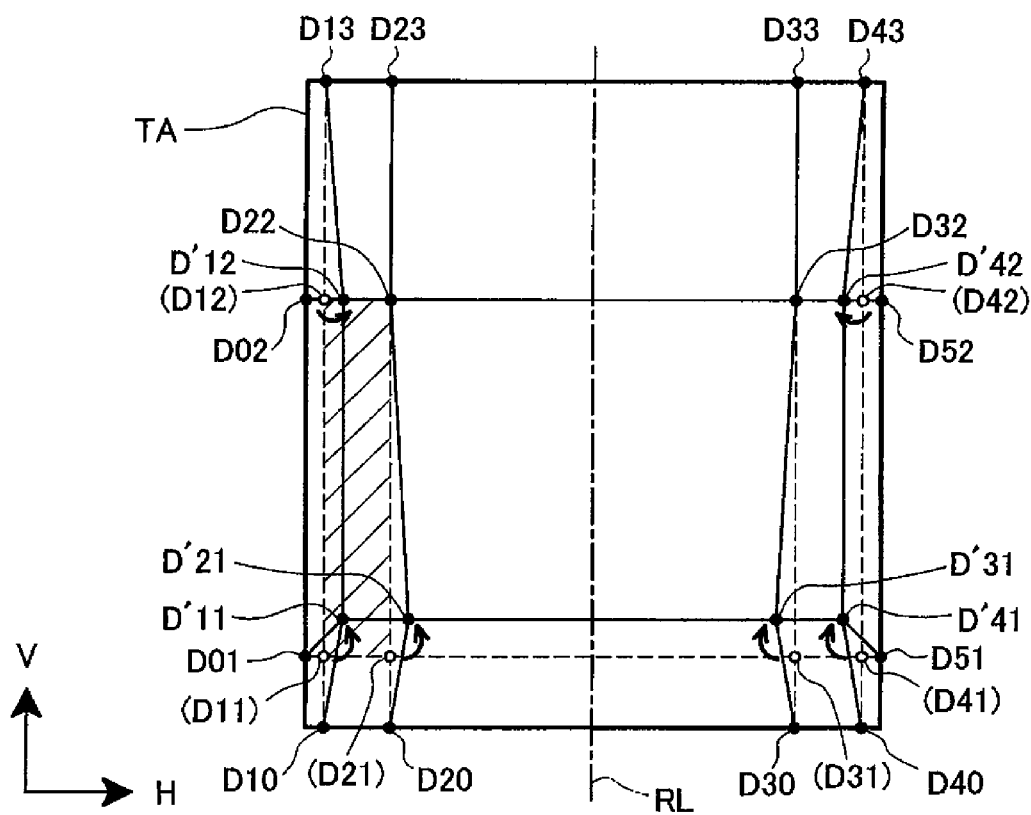
FIG. 20 is an explanatory diagram showing an example of contents of a dividing point movement table.
FIG. 21 is an explanatory view showing an example of a movement in a position of a dividing point in accordance with the dividing point movement table.

FIG. 20 is an explanatory diagram showing an example of the contents of the dividing point movement table 420. Moreover, FIG. 21 is an explanatory view showing an example of the movement of the position of the dividing point D in accordance with the dividing point movement table 420. FIG. 20 shows a moving manner corresponding to the combination of the transforming type for causing the face to be sharp and the transforming degree of the extent "middle" in the moving manners of the position of the dividing point D which are defined based on the dividing point movement table 420. As shown in FIG. 20, the dividing point movement table 420 indicates a moving amount in an orthogonal direction to the reference line RL (an H direction) and a parallel direction with the reference line RL (a V direction) for each of the dividing points D. In the example, a unit of the moving amount shown in the dividing point movement table 420 is a pixel pitch PP of the target image TI. Referring to the H direction, moreover, a rightward moving amount is represented as a positive value and a leftward moving amount is represented as a negative value. Referring to the V direction, an upward moving amount is represented as a positive value and a downward moving amount is represented as a negative value. For example, a dividing point D11 is moved rightward in the H direction by a distance which is seven times as great as the pixel pitch PP and is moved upward in the V direction by a distance which is 14 times as great as the pixel pitch PP. Since a dividing point D22 has a moving amount of zero in the H and V directions, for example, it is not moved.

In the example, it is assumed that a position of the dividing point D positioned on the outer frame of the transforming area TA (for example, a dividing point D10 shown in FIG. 21) is not moved in such a manner that a boundary between images on an inside and an outside of the transforming area TA is not unnatural. Accordingly, a moving manner for the dividing point D positioned on the outer frame of the transforming area TA is not defined in the dividing point movement table 420 shown in FIG. 20.

In FIG. 21, the dividing point D before the movement is shown in a white circle, and the dividing point D after the movement and the dividing point D having no movement of a position are shown in a black circle. Moreover, the dividing point D after the movement is referred to as a dividing point D'. For example, the position of the dividing point D11 is moved in a rightward upper direction of FIG. 21 so that a dividing point D'11 is obtained.

In the example, the moving manner is defined in such a manner that all of combinations of the two dividing points D having a symmetrical positional relationship with respect to the reference line RL (a combination of the dividing points D11 and D41, for example) also maintain the symmetrical positional relationship with respect to the reference line RL after the movement of the dividing point D.

The transforming portion 260 carries out a processing of transforming an image in such a manner that an image of each small area constituting the transforming area TA in a state set before the movement of the position of the dividing point D is newly defined by the movement of the position of the dividing point D. For example, in FIG. 21, an image of a small area using the dividing points D11, D21, D22 and D12 as apexes (a small area shown in hatching) is transformed into an image of a small area using the dividing points D'11, D'21, D22 and D'12 as apexes.

Figure 22:
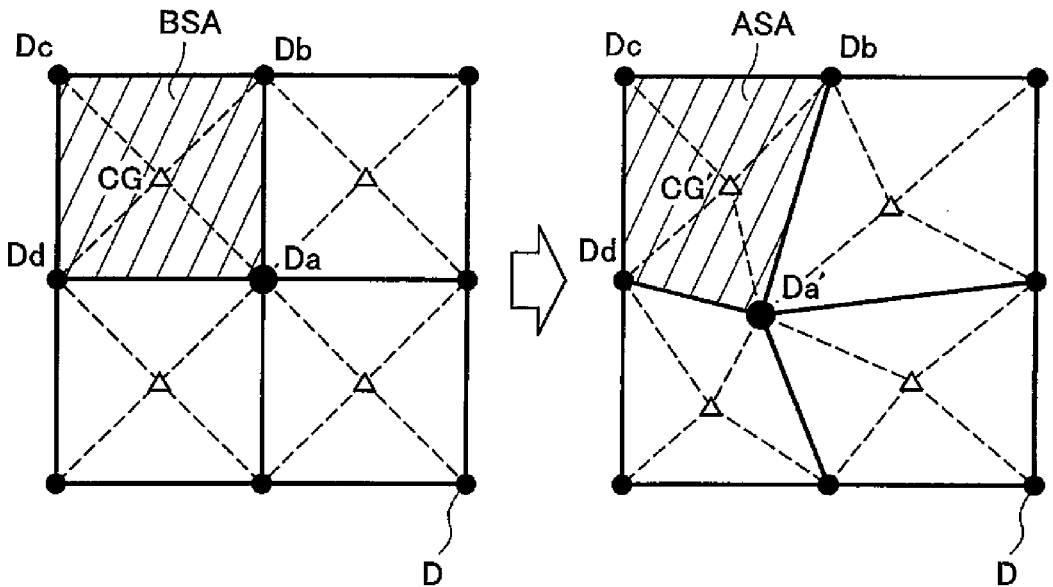
FIG. 22 is an explanatory view showing a concept of a method of transforming an image through a transforming portion.

FIG. 22 is an explanatory view showing a concept of a method of transforming an image through the transforming portion 260. In FIG. 22, the dividing point D is shown in a black circle. In FIG. 22, for simplicity of the description, a state set before the movement of the position of the dividing point D and a state set after the movement of the position of the dividing point D are shown on left and right sides respectively for four small areas. In the example of FIG. 22, a central dividing point Da is moved into a position of a dividing point Da' and the positions of the other dividing points are not moved. For example, consequently, an image of a small rectangular area (hereinafter referred to as a "before-transformation noted small area BSA") using the dividing points Da, Db, Dc and Dd before the movement of the dividing point D as apexes is transformed into an image of a small rectangular area (hereinafter referred to as an "after-transformation noted small area ASA") using the dividing points Da', Db, Dc and Dd as apexes.

In the example, the small rectangular area is divided into four triangular areas by using a center of gravity CG of the small area and a processing of transforming an image is carried out on a unit of the triangular area. In the example of FIG. 22, the before-transformation noted small area BSA is divided into four triangular areas in which the center of gravity CG of the before-transformation noted small area BSA is set to be one of the apexes. Similarly, the after-transformation noted small area ASA is divided into four triangular areas in which a center of gravity CG' of the after-transformation noted small area ASA is set to be one of the apexes. The processing of transforming an image is carried out every triangular area corresponding to each of the states before and after the movement of the dividing point Da. For example, an image of a triangular area using, as apexes, the dividing points Da and Dd and the center of gravity CG in the before-transformation noted small area BSA is transformed into an image of a triangular area using, as apexes, the dividing points Da' and Dd and the center of gravity CG' in the after-transformation noted small area ASA.

Figure 23:
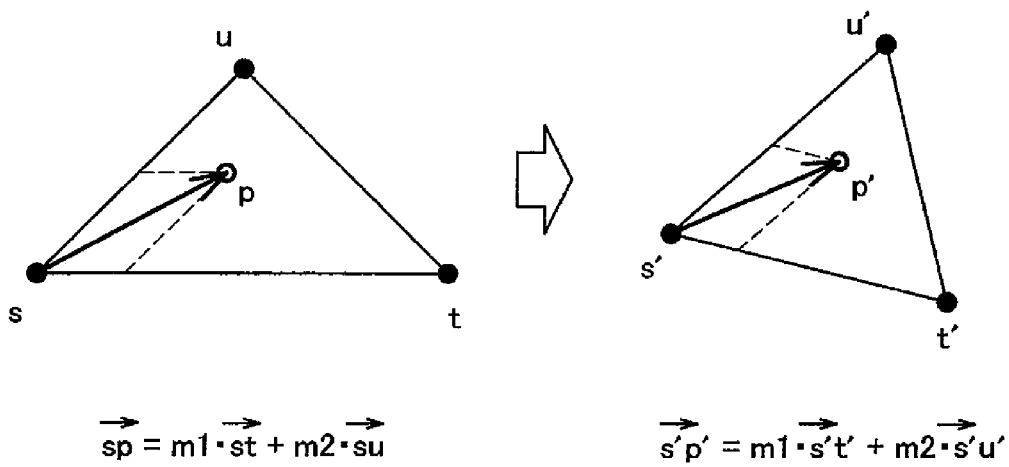
FIG. 23 is an explanatory view showing a concept of the method of transforming an image in a triangular area.

FIG. 23 is an explanatory view showing a concept of the method of transforming an image in the triangular area. In the example of FIG. 23, an image of a triangular area stu using points s, t and u as apexes is transformed into an image of a triangular area s't'u' using points s', t' and u' as apexes. The transformation of the image is carried out by calculating a position in the image of the triangular area stu before the transformation to which a position of any of the images in the triangular area s't'u' after the transformation corresponds and setting a pixel value in the image before the transformation in the calculated position to be a pixel value of the image obtained after the transformation.

For example, in FIG. 23, it is assumed that a position of a noted pixel p' in the image of the triangular area s't'u' obtained after the transformation corresponds to a position p in the image of the triangular area stu before the transformation. The calculation of the point p is carried out in the following manner. First of all, there are calculated coefficients m1 and m2 for representing the position of the noted pixel p' as a sum of a vector s't' and a vector s'u' as expressed in the following Equation (1).

$$\vec{s'p'} = m1 \cdot \vec{s't'} + m2 \cdot \vec{s'u'} \quad \text{[Equation 1]}$$

By using the coefficients m1 and m2 thus calculated, next, a sum of vectors st and su in the triangular area stu before the transformation is calculated by the following Equation (2) so that the position p is obtained.

$$\vec{sp} = m1 \cdot \vec{st} + m2 \cdot \vec{su} \quad \text{[Equation 2]}$$

In the case in which the position p in the triangular area stu before the transformation is coincident with a pixel center position of the image which has not been transformed, a pixel value of the pixel is set to be a pixel value of the image obtained after the transformation. On the other hand, in the case in which the position p in the triangular area stu which has not been transformed is shifted from the pixel center position of the image which has not been transformed, a pixel value in the position p is calculated by an interpolating calculation such as a bicubic using a pixel value of a pixel around the position p, and the pixel value thus calculated is set to be a pixel value of the image obtained after the transformation.

By calculating the pixel value for each of the pixels in the image of the triangular area s't'u' obtained after the transformation as described above, it is possible to carry out the image transformation processing from the image of the triangular area stu to that of the triangular area s't'u'. The transforming portion 260 defines the triangular area to carry out the transformation processing as described above for each of the small areas constituting the transforming area TA shown in FIG. 21, and thus executes the image transformation processing in the transforming area TA.

Figure 24:
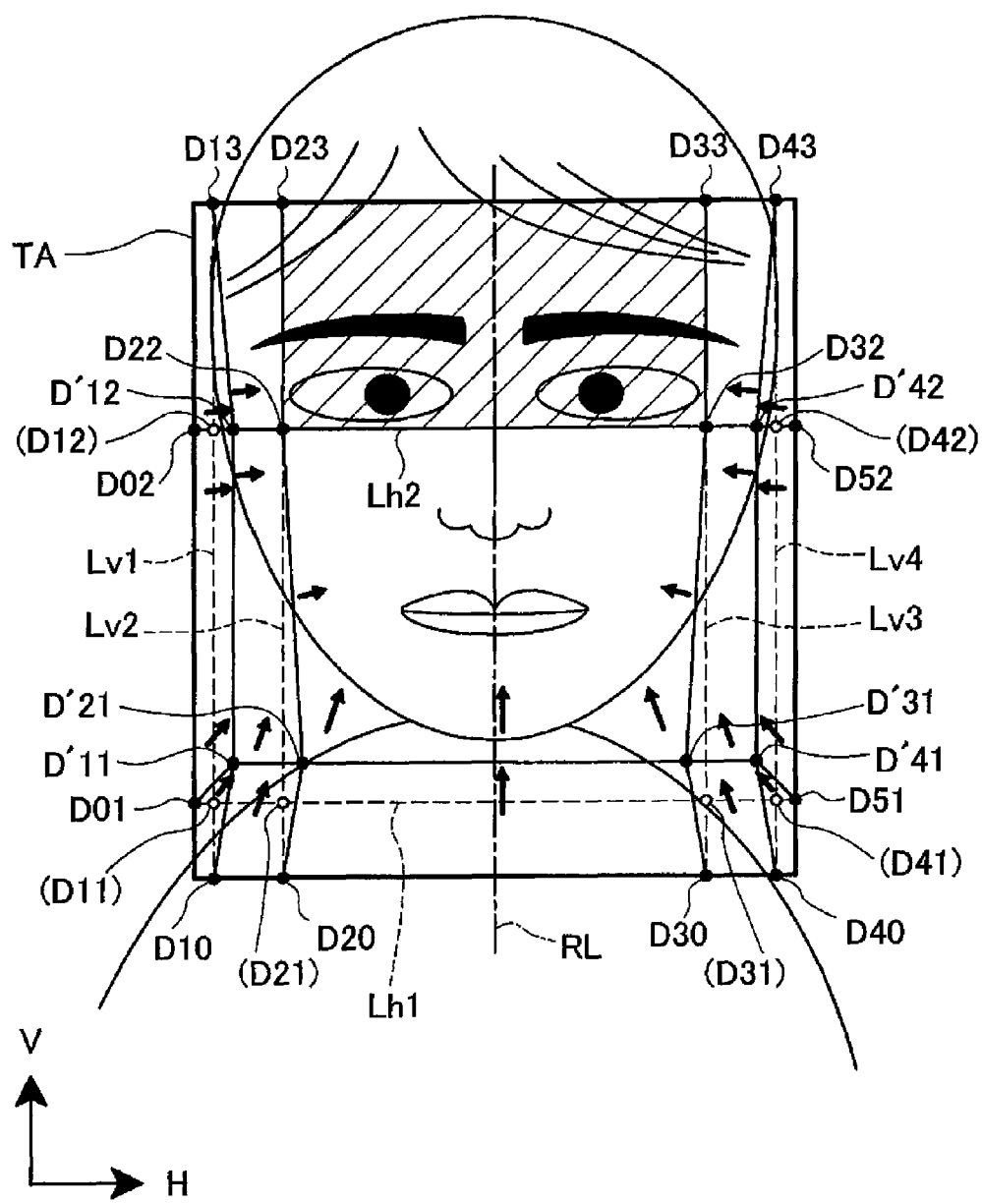
FIG. 24 is an explanatory view showing a face shape correcting manner according to the example.

A manner for correcting a face shape according to the example will be described in more detail. FIG. 24 is an explanatory view showing the manner for correcting a face shape according to the example. In the example, as described above, the transforming "type A" for causing the face to be sharp (see FIG. 5) is set as the transforming type, and the degree of the extent "middle" is set as the transforming degree. FIG. 24 shows, in an arrow, an image of a manner for transforming each of the small areas constituting the transforming area TA.

As shown in FIG. 24, in the correction of the face shape according to the example, the position of the dividing point D (D11, D21, D31, D41) disposed on the horizontal dividing line Lh1 is moved upward, while the position of the dividing point D (D12, D22, D32, D42) disposed on the horizontal dividing line Lh2 is not moved with respect to the parallel direction with the reference line RL (the V direction) (see FIG. 20). Accordingly, an image positioned between the horizontal dividing lines Lh1 and Lh2 is reduced with respect to the V direction. As described above, the horizontal dividing line Lh1 is disposed below the image of the chin and the horizontal dividing line Lh2 is disposed in the vicinity of the just lower part of the image of the eye. In the face shape correction according to the example, therefore, an image of a portion from the chin to the lower part of the eye in the image of the face is reduced in the V direction. As a result, a line of the chin in the image is moved upward.

On the other hand, referring to the orthogonal direction to the reference line RL (the H direction), the position of the dividing point D (D11, D12) disposed on the vertical dividing line Lv1 is moved in a rightward direction and the position of the dividing point D (D41, D42) disposed on the vertical dividing line Lv4 is moved in a leftward direction (see FIG. 20). Furthermore, the position of the dividing point D (D21) disposed on the horizontal dividing line Lh1 in the two dividing points D disposed on the vertical dividing line Lv2 is moved in a rightward direction and the position of the dividing point D (D31) disposed on the horizontal dividing line Lh1 in the two dividing points D disposed on the vertical dividing line Lv3 is moved in a leftward direction (see FIG. 20). Accordingly, an image positioned on a left side of the vertical dividing line Lv1 is enlarged rightward with respect to the H direction and an image positioned on a right side of the vertical dividing line Lv4 is enlarged leftward. Moreover, an image positioned between the vertical dividing lines Lv1 and Lv2 is reduced or moved rightward with respect to the H direction, and an image positioned between the vertical dividing lines Lv3 and Lv4 is reduced or moved leftward with respect to the H direction. Furthermore, an image positioned between the vertical dividing lines Lv2 and Lv3 is reduced with respect to the H direction around the position of the horizontal dividing line Lh1.

As described above, the vertical dividing lines Lv1 and Lv4 are disposed on an outside of the image of the cheek line and the vertical dividing lines Lv2 and Lv3 are disposed on an outside of the images of the corners of the eyes. In the face shape correction according to the example, therefore, images in outside parts of the corners of both eyes in the image of the face are wholly reduced in the H direction. In particular, a reduction ratio is increased in the vicinity of the chin. As a result, the shape of the face in the image is wholly thinned in the transverse direction.

When the transforming manners in the H and v directions are integrated, the shape of the face in the target image TI is made sharp through the face shape correction according to the example. The sharpness of the face shape can also be expressed to be a so-called "small face".

Small areas (shown in hatching) using the dividing points D22, D32, D33 and D23 as apexes shown in FIG. 24 include the images of both eyes according to the method of arranging the horizontal dividing line Lh2 and the vertical dividing lines Lv2 and Lv3. As shown in FIG. 20, the dividing points D22 and D32 are moved in neither the H direction nor the V direction. Therefore, the small area including the images of both eyes is not transformed. According to the example, thus, it is assumed that the small area including the images of both eyes is not transformed and the image obtained after correcting the face shape is more natural and preferable.

Figure 25:
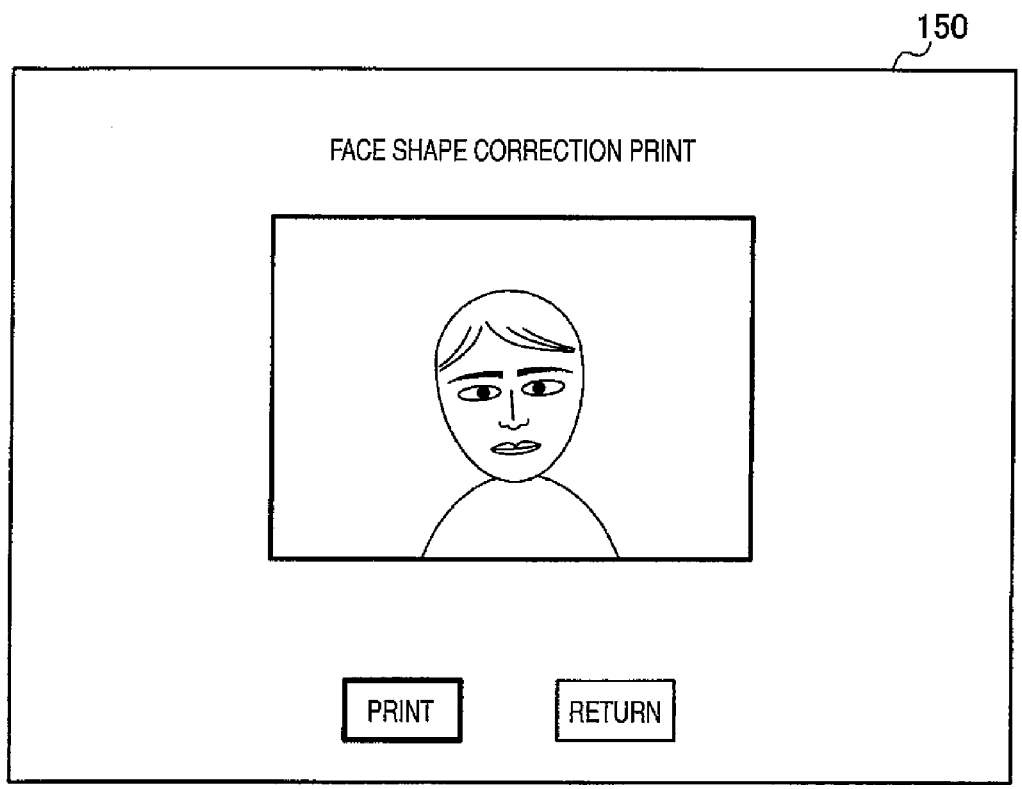
FIG. 25 is an explanatory view showing an example of a state of a display portion on which a target image obtained after the face shape correction is displayed.

At Step S190 (FIG. 4), the face shape correcting portion 200 (FIG. 1) gives the displaying portion 310 an instruction for displaying, on the display portion 150, the target image TI obtained after correcting the face shape. FIG. 25 is an explanatory view showing an example of a state of the display portion 150 on which the target image TI obtained after correcting the face shape is displayed. By the display portion 150 on which the target image TI obtained after correcting the face shape is displayed, a user can confirm a result of the correction. In the case in which the user does not satisfy the result of the correction but selects a "return" button, a screen for selecting the transforming type and the transforming degree shown in FIG. 5 is displayed on the display portion 150, for example, and the transforming type and the transforming degree are reset by the user. In the case in which the user satisfies the result of the correction and selects a "print" button, the following corrected image print processing is started.

Figures 26, 27:
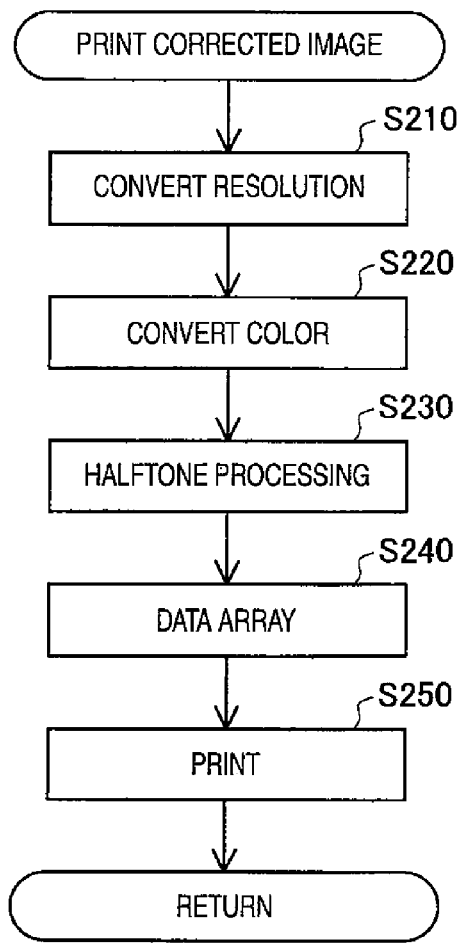
FIG. 26 is a flowchart showing a flow of a corrected image print processing according to the example.
FIG. 27 is an explanatory diagram showing another example of the contents of the dividing point movement table.

At Step S200 (FIG. 3), the printing portion 320 (FIG. 1) controls the printer engine 160 and prints the target image TI obtained after the face shape correction processing. FIG. 26 is a flowchart showing a flow of the corrected image print processing according to the example. The printing portion 320 converts a resolution of image data of the target image TI obtained after the face shape correction processing into a resolution which is suitable for the print processing to be carried out by the printer engine 160 (Step S210) and converts image data obtained after converting the resolution into ink color image data represented in a gradation through a plurality of ink colors to be used for the print in the printer engine 160 (Step S220). In the example, it is assumed that a plurality of ink colors to be used for the print in the printer engine 160 includes four colors, that is, cyan (C), magenta (M), yellow (Y) and black (K). Furthermore, the printing portion 320 executes a halftone processing based on a gradation value of each of the ink colors in the ink color image data, thereby generating dot data indicative of a formation state of an ink dot every print pixel (Step S230) and arranging the dot data to generate print data (Step S240). The printing portion 320 supplies the generated print data to the printer engine 160 and causes the printer engine 160 to print the target image TI (Step S250). Consequently, the target image TI obtained after correcting the face shape is printed completely.

A-3. Variant of First Example

In the first example, the description has been given to the face shape correction processing in the case in which the transforming "type A" (see FIG. 5) for causing the face to be sharp is set as the transforming type and the degree of the extent "middle" is set as the transforming degree. In the case in which these setting operations are different from each other, different face shape correction print processings are executed.

As described above, the manner for moving the position of the dividing point D for the transformation processing (the moving direction and the moving distance) is determined corresponding to the combination of the transforming type and the transforming degree through the dividing point movement table 420 (FIG. 1). Accordingly, in the case in which an extent "large" is set in place of the extent "middle" as the transforming degree, for example, the dividing point D is moved in the moving manner corresponding to the extent "large" which is determined in the dividing point movement table 420.

FIG. 27 is an explanatory diagram showing another example of the contents of the dividing point movement table 420. FIG. 27 shows a manner for moving the position of the dividing point D corresponding to a combination of a trans forming type for causing the face to be sharp and a transforming degree of the extent "large". In the moving manner shown in FIG. 27, values of moving distances in H and v directions are greater as compared with the moving manner corresponding to the combination of the transforming type for causing the face to be sharp as shown in FIG. 20 and the transforming degree of the extent "middle". In the case in which the extent "large" is set as the transforming degree, accordingly, there is increased a transforming amount in any of the small areas constituting the transforming area TA which is to be transformed. As a result, the shape of the face in the target image TI is made sharper.

As described above, moreover, the manner for arranging the dividing point D in the transforming area TA (the number and the positions of the dividing points D) is defined corresponding to the set transforming type through the dividing point arranging pattern table 410 (FIG. 1). Accordingly, in the case in which a transforming "type B" for enlarging an eye (see FIG. 5) is set in place of the transforming type for causing the face to be sharp as the transforming type, for example, the dividing point D is arranged in a manner corresponding to the transforming type for enlarging the eye.

Figures 28, 29:
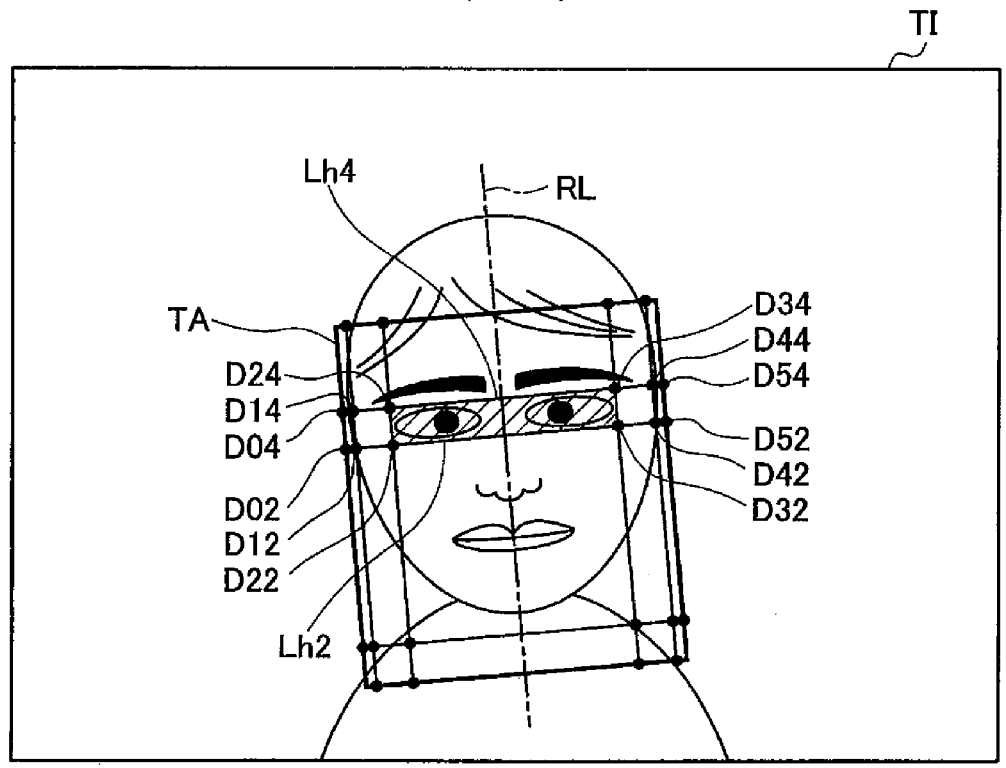
FIG. 28 is an explanatory view showing an example of another method of arranging the dividing point.
FIG. 29 is an explanatory diagram showing a further example of the contents of the dividing point movement table.

FIG. 28 is an explanatory view showing an example of another method of arranging the dividing point D. FIG. 28 shows a manner for arranging the dividing point D corresponding to the transforming type to enlarge the eye. In the arrangement of the dividing point D shown in FIG. 28, six dividing points D (D04, D14, D24, D34, D44, D54) positioned on a horizontal dividing line Lh4 are added as compared with the manner corresponding to the transforming type for causing the face to be sharp as shown in FIG. 19. The horizontal dividing line Lh4 is disposed in the vicinity of a just upper part of the image of the eye.

FIG. 29 is an explanatory diagram showing a further example of the contents of the dividing point movement table 420. FIG. 29 shows a manner for moving the position of the dividing point D corresponding to a combination of the transforming type for enlarging the eye and the transforming degree of the extent "middle". FIG. 29 shows a moving manner related to only the dividing points D on the horizontal dividing lines Lh2 and Lh4 (FIG. 28) which is extracted. It is assumed that any of the dividing points D other than the dividing points D shown in FIG. 29 is not moved.

When the dividing point D is moved in the manner shown in FIG. 29, an image of a small rectangular area (shown in hatching of FIG. 28) using the dividing points D22, D32, D34 and D24 as apexes is enlarged in a parallel direction with the reference line RL. Accordingly, the shape of the eye in the target image TI is enlarged vertically.

As described above, in the example, in the case in which a request is given through the user interface shown in FIG. 5, the details of the transforming manner are designated by the user. In this case, the moving manner of the dividing point D is designated by the user after the arrangement of the dividing point D in accordance with a pattern corresponding to a transforming type which is set (the Step S170 in FIG. 4).

Figure 30:
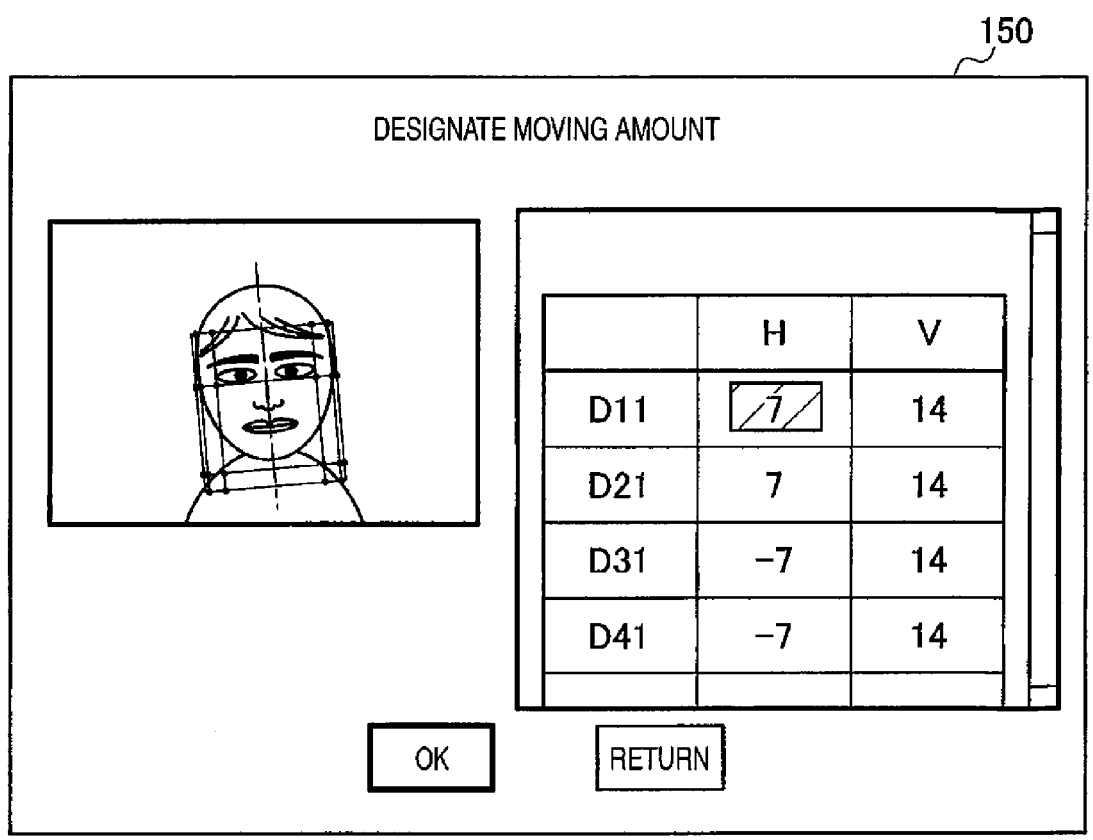
FIG. 30 is an explanatory view showing an example of a user interface for designating a moving manner of the dividing point through a user.

FIG. 30 is an explanatory view showing an example of the user interface for designating the manner for moving the dividing point D through the user. In the case in which the request for designating the details of the transforming manner is given by the user, the designation acquiring portion 212 of the printer 100 (FIG. 1) gives the displaying portion 310 an instruction for displaying, on the display portion 150, the user interface shown in FIG. 30 after the arrangement of the dividing point D is completed. In the user interface shown in FIG. 30, an image indicative of the arrangement of the dividing point D on the transforming area TA of the target image TI is displayed on a left side and the interface for designating the manner for moving the dividing point D is disposed on a right side. The user can optionally designate moving amounts in the H and V directions for each of the dividing points D through the user interface. The transforming portion 260 (FIG. 1) carries out the transformation processing by moving the dividing point D in the moving manner designated through the user interface.

In the user interface shown in FIG. 30, a moving amount of a default in each of the H and V directions for each of the dividing points D is determined depending on the set transforming type (for example, a transforming type for causing the face to be sharp) in an initial condition and the user modifies a moving amount for a desirable one of the dividing points D. Thus, the user can finely regulate and designate the moving amount while referring to the moving amount of the default. Thus, it is possible to implement an image transformation processing of finely regulating an image transformation of a desirable transforming type.

As described above, in the face shape correction print processing to be carried out by the printer 100 according to the example, a plurality of dividing points D is arranged in the transforming area TA set onto the target image TI, and the transforming area TA is divided into a plurality of small areas by using the straight lines for connecting the dividing points D (the horizontal dividing line Lh and the vertical dividing line Lv). Moreover, there is executed the processing of transforming an image in the transforming area TA by moving the position of the dividing point D and transforming the small area. In the face shape correction print processing to be carried out by the printer 100 according to the example, thus, it is possible to transform an image by simply arranging the dividing point D in the transforming area TA and moving the dividing point D thus arranged. Thus, the transformation of the image corresponding to various transforming manners can be implemented easily and efficiently.

In the face shape correction print processing to be carried out by the printer 100 according to the example, moreover, the dividing point D is arranged in accordance with the arranging pattern corresponding to any of the transforming types which is selected and set. For this reason, there is carried out the arrangement of the dividing point D, that is, the division of the transforming area TA which is suitable for respective transforming types, for example, the transforming type for causing the face to be sharp and the transforming type for enlarging the eye. Thus, it is possible to implement the image transformation of each of the transforming types more easily.

In the face shape correction print processing to be carried out by the printer 100 according to the example, moreover, the dividing point D is moved in the moving manner (the moving direction and the moving amount) corresponding to the combination of the transforming type and the transforming degree which are selected and set. If the transforming type and the transforming degree are set, therefore, the image transformation is executed depending on their combination. Thus, the image transformation can be implemented more easily.

In the face shape correction print processing to be carried out by the printer 100 according to the example, moreover, the arrangement of the dividing point D in the transforming area TA is symmetrical with respect to the reference line RL, and the moving manner of the dividing point D is determined in such a manner that all of the combinations of two dividing points D having a symmetrical positional relationship with respect to the reference line RL maintain the symmetrical positional relationship with respect to the reference line RL after the movement of the dividing point D. In the face shape correction print processing according to the example, therefore, the symmetrical image transformation with respect to the reference line RL is carried out. Consequently, it is possible to implement the image transformation of the face image which is more natural and preferable.

In the face shape correction print processing to be carried out by the printer 100 according to the example, furthermore, it is possible to prevent the transformation from being carried out for a part of the small areas constituting the transforming area TA. More specifically, as shown in FIG. 24, it is possible to set the arrangement and moving manner of the dividing point D in such a manner that the transformation is not carried out for the small areas including the images of both eyes. By preventing the transformation from being carried out for the small areas including the images of both eyes, thus, it is possible to implement the image transformation of the face image which is more natural and preferable.

In the face shape correction print processing to be carried out by the printer 100 according to the example, moreover, in the case in which a request for designating the details of the transforming manner is given by the user, the moving amounts in the H and V directions are designated for each of the dividing points D through the user interface and the position of the dividing point D is moved in accordance with the designation. Therefore, it is possible to easily implement the image transformation in a closer manner to the request of the user.

In the face shape correction print processing to be carried out by the printer 100 according to the example, furthermore, the positioning in the vertical direction of the face area FA which is detected is executed (the Step S140 in FIG. 4) before setting the transforming area TA (the Step S160 in FIG. 4). Therefore, a more adapted face area FA can be set into the position of the image of the face in the target image TI, and the result of the image transformation processing in the transforming area TA set based on the face area FA can be made more preferable.

Moreover, the positioning of the face area FA according to the example is executed by referring to the position along the reference line RL of the image of the eye to be a reference object. In the example, an evaluation value representing a feature of the distribution of the pixel value in the orthogonal direction to the reference line RL is calculated for a plurality of evaluating positions along the reference line RL in the specific area SA set as the area including the image of the eye. Therefore, it is possible to detect a position along the reference line RL of the image of the eye based on the evaluation value thus calculated.

More specifically, it is possible to detect the position of the image of the eye by selecting the evaluating target pixel TP for each of the target pixel specifying lines PL which are orthogonal to the reference line RL and using, as the evaluation value, the mean value of the R value of the evaluating target pixel TP.

Moreover, the position of the image of the eye is detected individually for the left dividing specific area SA(l) and the right dividing specific area SA(r) which are set to include an image of one of the eyes, respectively. As compared with the case in which the position of the image of the eye is detected by setting the whole specific area SA as a target, therefore, it is possible to eliminate the influence of a positional shift along the reference line RL for left and right eyes, thereby enhancing precision in the detection.

In the calculation of the evaluation value for detecting the position of the image of the eye, furthermore, it is assumed that a part of the selected evaluating target pixels TP which has a great R value is excluded from the calculating target of the evaluation value for each of the target pixel specifying lines PL. By excluding, from the calculating target of the evaluation value, a part of the evaluating target pixels TP which is supposed to have a great difference in a color from the image of the eye to be the reference object, therefore, it is possible to enhance precision in the detection of the position of the image of the eye more greatly.

In the face shape correction print processing to be carried out by the printer 100 according to the example, moreover, the regulation of the tilt of the face area FA is executed (the Step S150 in FIG. 4) before setting the transforming area TA (the Step S160 in FIG. 4). Therefore, a more adapted face area FA can be set to the tilt of the image of the face in the target image TI, and a result of the image transformation processing in the transforming area TA set based on the face area FA can be made more preferable.

In addition, the regulation of the tilt of the face area FA according to the example is executed by referring to the tilt of the images of both eyes to be the reference objects. In the example, the area including the images of both eyes is set to be the evaluating specific area ESA corresponding to each of the evaluating direction lines EL obtained by rotating the reference line RL at various angles. In each of the evaluating specific areas ESA, the evaluation value representing the feature of the distribution of the pixel value in the orthogonal direction to the evaluating direction is calculated for the evaluating positions in the evaluating direction. Based on the evaluation value thus calculated, therefore, it is possible to detect the tilt of the images of both eyes.

More specifically, referring to each of the evaluating specific areas ESA, by selecting the evaluating target pixel TP for the target pixel specifying lines PL which are orthogonal to the evaluating direction line EL, calculating the mean value of the R value of the evaluating target pixel TP as the evaluation value and determining an evaluating direction in which a variance of the evaluation value is a maximum, it is possible to detect the tilt of the images of both eyes.

In the calculation of the evaluation value for detecting the tilt of the images of both eyes, moreover, it is assumed that a part of the selected evaluating target pixels TP which has a great R value is excluded from the calculating target of the evaluation value for each of the target pixel specifying lines PL. By excluding a part of the evaluating target pixels TP which is supposed to have a greater difference in a color from the images of both eyes to be the reference objects from the calculating target of the evaluation value, therefore, it is possible to enhance the precision in the detection of the tilt of the images of both eyes more greatly.

In the face shape correction print processing to be carried out by the printer 100 according to the example, furthermore, a plurality of small areas constituting the transforming area TA is divided into four triangular areas and the image transformation processing is carried out on a unit of the triangular area. At this time, the division of the small area into four triangles is carried out by using a segment connecting each of the apexes of the small area to the center of gravity CG (CG') before and after the transformation, respectively. The position of the center of gravity of the small area can be calculated from coordinates of the four apexes. As compared with the case in which the transforming area TA is divided into the small triangular areas from the beginning, therefore, it is possible to decrease the number of the coordinates to be designated, thereby increasing a speed of the processing. In the case in which the image is transformed without the division of the small area into the triangles, moreover, there is a possibility that the small area might take a shape having an interior angle exceeding 180 degrees, resulting in a hindrance to the transformation processing depending on the moving direction and amount of each of the apexes (the dividing points D) of the small area. In the example, the transformation processing is carried out through the division of the small area into the triangles. Therefore, it is possible to prevent the drawback from being generated and to carry out the processing smoothly and stably.

B. Other Variants

The invention is not restricted to the examples and the embodiment but can be carried out in various manners without departing from the scope thereof and the following transformation can also be performed, for example.

B1. Other Variant 1

While the mean value of the R value for each of the target pixel specifying lines PL is used as the evaluation value in the positioning or tilt regulation of the face area FA in the example (see FIGS. 9 and 15), it is also possible to employ, as the evaluation value, other values representing the distribution of the pixel value in the direction of the target pixel specifying line PL (that is, the orthogonal direction to the reference line RL). For example, it is also possible to use a mean value of a luminance value or an edge amount. It can be supposed that the portion of the image of the eye to be the reference object has a luminance value or an edge amount which is greatly different from that of the image of a surrounding skin portion. Therefore, the values can also be used as the evaluation values.

For the values, moreover, it is also possible to use the number of pixels having a cumulative value or a value which is equal to or smaller than (or is equal to or greater than) a threshold in place of a mean value of the pixel to be the evaluating value calculating target. For example, it is also possible to use, as the evaluation value, the cumulative value of the R value for each of the target pixel specifying lines PL or the number of pixels having an R value which is equal to or smaller than a threshold. Although a part of the evaluating target pixels TP is not used for calculating the evaluation value for each of the target pixel specifying lines PL in the example, moreover, all of the evaluating target pixels TP may be used to calculate the evaluation value.

Although the mean value of the R value is used as the evaluation value on the premise that the Mongoloid is a target in the example, furthermore, other evaluation values (for example, a luminance, a brightness and a B value) may be used in the case in which another race (a white race or a black race) is intended.

B2. Other Variant 2

In the example, in the positioning or tilt regulation of the face area FA, n target pixel specifying lines PL are set to the specific area SA or the evaluating specific area ESA, and the evaluation value is calculated in the position of the target pixel specifying line PL (see FIGS. 9 and 15). However, the set number of the target pixel specifying lines PL does not need to be fixed to n but may be variably set according to the size of the specific area SA or the evaluating specific area ESA for the target image TI. For example, the pitch s of the target pixel specifying line PL may be fixed and the number of the target pixel specifying lines PL may be set depending on the size of the specific area SA or the evaluating specific area ESA.

B3. Other Variant 3

While the evaluating direction is set within a range of 20 degrees clockwise and counterclockwise around the direction of the reference line RL in the regulation of the tilt of the face area FA in the example (see FIG. 15), it is also possible to set the evaluating direction within a range of 20 degrees clockwise and counterclockwise around the direction of the approximate tilt angle RI which is calculated in the positioning of the face area FA.

Although the evaluating direction is set at the pitch of the certain angle α in example, moreover, the pitches of the evaluating directions do not need to be constant. For example, it is also possible to reduce the pitch and to thus set the evaluating direction within a close range to the direction of the reference line RL, and to increase the pitch and to thus set the evaluating direction within a distant range from the reference line RL.

Although the specific area SA corresponding to the face area FA subjected to the positioning is set to be the initial evaluating specific area ESA(0) in the regulation of the tilt of the face area FA in the example, furthermore, the initial evaluating specific area ESA(0) may be set independently of the specific area SA.

B4. Other Variant 4

In the example, in the regulation of the tilt of the face area FA, the evaluating directions are set and the evaluating specific area ESA corresponding to the evaluating direction line EL representing each of the evaluating directions is set. The evaluating specific area ESA is obtained by rotating the initial evaluating specific area ESA(0) at an equal angle to the rotating angle from the reference line RL of the evaluating direction line EL (see FIG. 15). However, the evaluating specific area ESA does not need to be always set as the same area. For example, all of the evaluating specific areas ESA corresponding to the evaluating direction lines EL may be set to be the same areas as the initial evaluating specific area ESA(0). Also in this case, it is preferable to calculate the mean value of the R value to be the evaluation value in the same manner for the target pixel specifying line PL which is orthogonal to the evaluating direction line EL. Also in this case, it is possible to implement the regulation of the tilt of the face area FA which is adapted to the tilt of the image by selecting the evaluating direction in which the variance of the evaluation value takes a maximum value.

B5. Other Variant 5

In the example, in the positioning and tilt regulation of the face area FA, the position and tilt of the image of the eye to be the reference object is detected. By using the position and the tilt which are thus detected, the positioning and tilt regulation of the face area FA is executed. However, another image, for example, an image of a nose or a mouth may be used as the reference object.

Moreover, the detection of the position and tilt of the image of the reference object according to the example is not restricted to the case in which the positioning and tilt regulation of the face area FA is intended but can be widely applied to the case in which the position and tilt of the image of the reference object in the target image TI is detected. In this case, the reference object is not restricted to the face portion but an optional object can be employed as the reference object.

B6. Other Variant 6

Although the transforming area TA (see FIG. 18) is set to take the oblong shape in the example, the transforming area TA may be set to take another shape, for example, an elliptical shape or a rhombic shape.

Moreover, the method of dividing the transforming area TA into small areas according to the example (see FIGS. 19 and 28) is only illustrative and other dividing methods can also be employed. For example, the arrangement of the dividing point D in the transforming area TA can be optionally changed. Furthermore, the small area does not need to take the oblong shape but may take a rectangular shape or a polygonal shape. In addition, it is preferable that the arrangement of the dividing point D in the transforming area TA should be carried out in accordance with a user designation.

B7. Other Variant 7

In the example, a part of the transforming area TA is protruded from the target image TI in some cases. In those cases, a part of the dividing point D cannot be disposed on the target image TI. In the case in which a part of the dividing points D cannot be disposed on the target image TI, the horizontal dividing line Lh and the vertical dividing line Lv for defining the position of the dividing point D (see FIG. 19) may be deleted and only the dividing points D defined by the residual horizontal dividing line Lh and vertical dividing line Lv may be used to execute the division of the transforming area TA into the small areas. In the case in which a part of the dividing points D cannot be disposed on the target image TI, alternatively, the face shape correction does not need to be executed.

B8. Other Variant 8

In the example, the contents of the face shape correction print processing (FIG. 3) are only illustrative and the order of each step may be changed or the execution of a part of the steps may be omitted. For example, the resolution conversion or the color conversion in the print processing (the Step S210 or S220 in FIG. 26) may be executed before the face shape correction (the Step S100 in FIG. 3).

Moreover, the order of the positioning of the face area FA (the Step S140 in FIG. 4) and the regulation of the tilt of the face area FA (the Step S150 in FIG. 4) may be reversed. In addition, it is also possible to execute only one of the processings and to omit the other processing. Furthermore, it is also possible to set the transforming area TA (the Step S160 in FIG. 4) immediately after the detection of the face area FA (the Step S130 in FIG. 4) and to carry out the same poisoning and tilt regulation by setting the set transforming area TA to be a target. Also in this case, the transforming area TA includes at least the image of a part of the face. Therefore, it is possible to carry out the positioning and tilt regulation of the area including the image of the face.

While the detection of the face area FA (the Step S130 in FIG. 4) is executed in the example, moreover, it is also possible to acquire information about the face area FA through a user designation in place of the detection of the face area FA, for example.

B9. Other Variant 9

While the description has been given to the face shape correction print processing (FIG. 3) to be carried out by the printer 100 serving as the image processing apparatus in the example, the face shape correction (the Step S100 in FIG. 3) may be executed by means of a personal computer and only the print processing (Step S200) may be executed by means of a printer in the face shape correction print processing, for example. Moreover, the printer 100 is not restricted to an ink jet printer but printers using other methods, for example, a laser printer or a sublimatic printer may be employed.

B10. Other Variant 10

In the example, a part of the structure implemented in hardware may be replaced with software. To the contrary, a part of the structure implemented in the software may be replaced with the hardware.

According to an aspect of the invention, a plurality of dividing points is arranged in the transforming area set onto the target image and the transforming area is divided into a plurality of small areas by using the straight line connecting the dividing points. Moreover, the position of the dividing point is moved and the small area is transformed so that the processing of transforming the image in the transforming area is executed. Thus, the dividing point is arranged in the transforming area and the arranged dividing point is simply moved so that the image can be transformed. Thus, the image processing of transforming an image corresponding to various transforming manners can be implemented easily and efficiently.

The image processing apparatus may further include a transforming manner setting portion for selecting one of a plurality of predetermined transforming types and setting the type as a transforming type to be applied to a transformation of an image in the transforming area. The transforming area dividing portion may arrange the dividing points in accordance with a predetermined arranging pattern corresponding to the set transforming type.

Thus, the arrangement of the dividing points, that is, the division of the transforming area which is suitable for respective transforming types such as a transforming type for causing a face to be sharp and a transforming type for enlarging eyes is carried out. Therefore, it is possible to implement a further easiness of the image processing for transforming an image corresponding to each of the transforming types.

Moreover, the transforming manner setting portion may select one of a plurality of predetermined transforming degrees and may set the transforming degree as a transforming degree to be applied to a transformation of an image in the transforming area. The transforming portion may move a position of the dividing point in accordance with a predetermined moving direction and moving amount corresponding to a combination of the transforming type and the transforming degree which are set.

If the transforming type and the transforming degree are set, thus, the image transformation corresponding to their combination is executed. Therefore, it is possible to implement a further easiness of the image processing for transforming an image.

Furthermore, the transforming manner setting portion may include a designation acquiring portion for acquiring a user designation related to a moving direction and a moving amount of the dividing point for at least one of the dividing points. The transforming portion may move a position of the dividing point in accordance with the acquired user designation.

Thus, it is possible to easily implement the image processing for transforming an image in a manner which is closer to a demand of a user.

Moreover, the transforming area setting portion may set the transforming area in such a manner that at least a part of an image of a face is included in the transforming area.

Consequently, it is possible to easily and efficiently implement the image processing for transforming an image corresponding to various transforming manners with an image of a face set to be a target.

Furthermore, the transforming area dividing portion may arrange the dividing points in such a manner that at least one pair of dividing points is mutually arranged in symmetrical positions with respect to a predetermined reference line. The transforming portion may move the at least one pair of dividing points while maintaining a positional relationship in which they are mutually symmetrical with respect to the predetermined reference line.

Thus, the symmetrical image transformation with respect to the predetermined reference line is carried out. Consequently, it is possible to implement an image processing for transforming an image of a face which is more natural and preferable.

Moreover, the transforming portion may not carry out the transformation for at least one of the small areas.

Consequently, it is possible to carry out a desirable image transformation without greatly changing an impression of a face. Thus, it is possible to implement an image processing for transforming a face image which is more natural and preferable.

Furthermore, the transforming portion may not carry out the transformation for the small areas including an image of an eye.

Thus, the small area including the image of the eye is not transformed. Consequently, it is possible to implement an image processing for transforming a face image which is more natural and preferable.

In addition, the image processing apparatus may further include a face area detecting portion for detecting a face area representing an image of a face on the target image. The transforming area setting portion may set the transforming area based on the face area thus detected.

For the image transformation in the transforming area set based on the face area detected from the target image, thus, it is possible to easily and efficiently implement the image processing for transforming an image corresponding to various transforming manners.

Moreover, the image processing apparatus may further include a printing portion for printing the target image subjected to a transformation of an image in the transforming area.

Thus, it is possible to easily and efficiently print an image obtained after the image transformation corresponding to various transforming manners.

The invention can be implemented in various manners, for example, an image processing method and apparatus, an image transforming method and apparatus, an image correcting method and apparatus, a computer program for implementing functions of the methods or apparatuses, a recording medium recording the computer program thereon, and a data signal including the computer program and materialized in a carrier.

What is claimed is:
1. An image processing apparatus, comprising:
  a transforming area setting unit, performing a setting process for setting at least a part of an area of a target as a transforming area, the transforming area including at least a part of a face area;
  a determining unit, performing a determine process for determining whether a part of the transforming are is disposed outside of the target image; and
  a transforming processing unit, performing a transforming process for transforming the transforming area in a case where a whole of the transforming area is disposed in the target image, and not performing the transforming process in a case where a part of the transforming area is disposed outside of the target image;
  a transforming area dividing unit, performing an arranging process for arranging a plurality of dividing points in the face area and a dividing process for dividing the transforming area into a plurality of small area by using the a line connecting the dividing points; and
  a transforming manner setting unit, performing a selecting process for selecting one of plurality of predetermine transforming types and a setting process for setting the one of the predetermined transforming types a transforming type to be used for transforming an image into the transforming area, wherein
  the transforming area dividing unit arranges the dividing points in accordance with a predetermined arranging pattern corresponding to the set transforming type, and the transforming processing unit moves a position of at least one of the dividing points to perform the transforming process;

wherein the transforming manner setting unit selects one of a plurality of predetermined transforming degrees and sets the one of the predetermined transforming degrees as a transforming degree to be used for transforming the image in the transforming area, and the transforming processing unit moves the position of the at least one of the dividing points, in accordance with a predetermined moving direction and moving amount corresponding to a combination of the set transforming type and the set transforming degree.

2. The image processing apparatus according to claim 1, wherein all of the small areas provided by the transforming area dividing unit have rectangular shape.

3. The image processing apparatus according to claim 1, wherein the transforming manner setting unit includes a designation acquirer for acquiring a user designation related to a moving direction and a moving amount for the at least one of the dividing points, and the transforming processing unit moves the position of the at least one of the dividing points in accordance with the acquired user designation.

4. The image processing apparatus according to claim 1, further comprising:

a transforming area dividing unit, performing an arranging process for arranging a plurality of dividing points in the face area and to divide the transforming area into a plurality of small areas by using a line connecting the dividing points, wherein the transforming area dividing unit arranges the dividing points in such a manner that at least one pair of the dividing points are mutually symmetrical with respect to a predetermined reference line, and the transforming processing unit moves the at least one pair of dividing points while maintaining a positional relationship in which the at least one pair of dividing points are mutually symmetrical with respect to the predetermined reference line.

5. The image processing apparatus according to claim 4, wherein all of the small areas provided by the transforming area dividing unit have rectangular shape.

6. The image processing apparatus according to claim 1, wherein the transforming processing unit transforms an image in the transforming area without transforming a part of the face area.

7. The image processing apparatus according to claim 6, wherein the part of the face area includes an image of an eye.

8. The image processing apparatus according to claim 1, further comprising:

a face area detecting unit, performing a detecting process for detecting the face area on the target image, wherein the transforming area setting unit sets the transforming area based on the detected face area.

9. The image processing apparatus according to claim 1, further comprising:

an image printing unit, performing a printing process for printing the target image in which an image in the transforming area is transformed.

10. An image processing method, comprising:

a transforming area setting unit, performing a setting process for setting at least a part of an area of a target as a transforming area, the transforming area including at least a part of a face area;

a determining unit, performing a determine process for determining whether a part of the transforming are is disposed outside of the target image; and a transforming processing unit, performing a transforming process for transforming the transforming area in a case where a whole of the transforming area is disposed in the target image, and not performing the transforming process in a case where a part of the transforming area is disposed outside of the target image;

a transforming area dividing unit, performing an arranging process for arranging a plurality of dividing points in the face area and a dividing process for dividing the transforming area into a plurality of small area by using the a line connecting the dividing points; and a transforming manner setting unit, performing a selecting process for selecting one of plurality of predetermine transforming types and a setting process for setting the one of the predetermined transforming types a transforming type to be used for transforming an image into the transforming area, wherein the transforming area dividing unit arranges the dividing points in accordance with a predetermined arranging pattern corresponding to the set transforming type, and the transforming processing unit moves a position of at least one of the dividing points to perform the transforming process;

wherein the transforming manner setting unit selects one of a plurality of predetermined transforming degrees and sets the one of the predetermined transforming degrees as a transforming degree to be used for transforming the image in the transforming area, and the transforming processing unit moves the position of the at least one of the dividing points, in accordance with a predetermined moving direction and moving amount corresponding to a combination of the set transforming type and the set transforming degree.

11. A non-transitory computer-readable recording medium in which a computer program causing a computer to execute the method according to claim 10 is recorded.

* * * * *